United States Patent [19]

Wilcox

[11] Patent Number: 4,964,040
[45] Date of Patent: Oct. 16, 1990

[54] COMPUTER HARDWARE EXECUTIVE

[75] Inventor: Dwight R. Wilcox, San Diego, Calif.

[73] Assignee: United States of America as represented by the Secretary of the Navy, Washington, D.C.

[21] Appl. No.: 455,438

[22] Filed: Jan. 3, 1983

[51] Int. Cl.$^5$ .............................................. G06F 9/22
[52] U.S. Cl. .................................................. 364/200
[58] Field of Search ........................ 364/200 MS File

[56] References Cited

U.S. PATENT DOCUMENTS

| 3,585,605 | 6/1971 | Gardner et al. | 364/200 |
| 3,757,312 | 9/1973 | Shore et al. | 364/200 |
| 4,507,748 | 3/1985 | Cotton | 364/200 X |

Primary Examiner—Raulfe B. Zache
Attorney, Agent, or Firm—R. F. Beers; E. F. Johnston; Harvey Fendelman

[57] ABSTRACT

The computer hardware executive is a special purpose associative processor which interfaces to the memory bus of a digital computer to provide high-speed execution of executive functions. These functions include task registration, task synchronization, normal, time-dependent and time-critical event registration and triggering, hierarchical event-to-semaphore translation, and buffer allocation. The programmer invokes an executive function by accessing the address in the hose computer address space dedicated to that function. The data written to or read from that address is the function operated or result, respectively. The hardware executive maintains task and event tables internally within its associative memory. The memory is organized such that the same field bit position of all table entries is accessed in parallel within a microinstruction cycle. Searches are performed by sequencing through the bit positions of interest. The computer hardware executive also contains an internal clock for comparison against time-dependent and time-critical event registrations. The executive function algorithms are executed by an internal microprogram.

23 Claims, 21 Drawing Sheets

| ZER | CLEAR EXCHANGE REGISTER |
| ITC | INCREMENT TIME COUNTER |
| IQC | INCREMENT QUEUE COUNTER |
| DQC | DECREMENT QUEUE COUNTER |
| LUTC | LOAD UPPER TIME COUNTER |
| LLTC | LOAD LOWER TIME COUNTER |
| LQC | LOAD QUEUE COUNTER |
| US | ADDRESS REGISTER CONTROL |

COMPUTER HARDWARE EXECUTIVE

BACKGROUND OF THE INVENTION

The present invention relates generally to the field of digital computers and, more particularly, to the field of executive function implementations.

An executive currently is defined as a program which regulates when each portion of the application software has access to the various resources of the computer. The application software informs the executive of its needs and available resources by calling executive service request (ESR) routines. Often several ESR's share common subroutine components. The one or more subroutine components of an ESR are called executive functions.

Executive functions are usually implemented in software. Occasionally, firmware implementations are used for speed improvement. While statistics in the literature vary, firmware implementations usually obtain a two to three times improvement in executive function execution speed. Their speed improvement is derived primarily through the elimination of most of the instruction fetches associated with software implementations. Executive functions make heavy use of data structures stored in memory. Consequently, the speed of the data access cycle is the major limiting factor preventing still further speed improvement through microprogramming.

The throughput of multiprocessing systems increases less than linearly with an increase in the number of processors. Each processor is burdened not only with the coordination of its own activity but also with at least some portion of the activity of the processors to which it is connected. Increasing the number of processors increases the overhead in each processor. Eventually, a point is reached where adding a processor has a negligible effect or even decreases the usable throughput of the system. This is because the increase in overhead in all the processors totals more than the capacity of the added processor.

One of the major manifestations of executive overhead is table searching. It is encountered in dispatch checking, real-time clock management, resource management, and event binding. To illustrate the effect, consider a multiprocessing system employing a common table. A configuration consisting of a single stand-alone processor spends some portion of its time serially searching a table. When a second processor is added to improve system capacity, both processors are required to search the same common table. The added contribution of processing from the second processor roughly doubles the original size of the table. Increasing the size of the table, and hence the time spent searching the table, leaves less time in each processor for other processing. The time each processor has available for other processing continues to decrease as additional processors are added.

Since table searching is an important component determining the speed of executive processing, executive software often exhibits similar characteristics. A good example is a common task table in a multiprocessing system in which the highest priority task ready for execution is dispatched on the first available processor. The dispatch check performed by each processor must examine all the tasks in the system. The larger the system, the more tasks each processor must examine, and consequently, the less application work performed by each processor.

Message processing in distributed processing systems also suffers from diminishing returns as processors are added. One example is SEAMOD, a proposed Navy distributed command and control system architecture. The processors of the system are interconnected through a high-speed message bus. It has been estimated in this proposed system that up to 58 percent more processors are required, depending on the configuration, simply to perform the executive functions associated with message traffic of the distributed system.

Another example of the problem is illustrated by an experiment performed by the developers of the Shipboard Integrated Processing and Display System (SHINPADS) for the Canadian Navy. They wished to demonstrate two megabits of data traffic on a triaxial cable bus interconnecting ten AN/UYK-20 computer emulators. Each computer generated and received one-tenth of the two megabit traffic. Using 200-bit messages, this means that each computer generated and received one message every millisecond. It was found that the one millisecond was consumed almost entirely by the executive software. Not only does such a system fail to apply the power of ten computers to the performance of the application work, but it fails to do almost any useful work.

The problem is that the execution speed of the executive functions is too slow in a conventional processor. The executive functions considered in the SEAMOD example, when executed on an AN/UYK-20 computer, would require 1.12 milliseconds per message. The motivation for high-speed execution of executive functions in hardware is the reduction of overhead in each processor of a multiprocessing or distributed processing system to extend the point of diminishing returns to a larger number of processors.

SUMMARY OF THE INVENTION

The computer hardware executive of the present invention overcomes the foregoing problem by implementing in hardware those executive functions which heretofore created particular execution speed bottlenecks in software executives. The hardware executive is not intended to replace a software executive in its entirety. A software executive can be built on top of the hardware executive which translates ESR's into either executive function calls on the hardware executive or on its own software as appropriate.

The computer hardware executive of the present invention is designed to be connected to the host processor through the memory interface of the host processor. The hardware executive appears to the host processor as a slow memory. The software of the host processor communicates with the computer hardware executive using a technique commonly know as "memory mapping." Each executive function is associated with a dedicated address in the address space of the hardware executive. In accordance with the present invention, the programmer invokes a hardware executive function by accessing the memory address associated with the desired function. The data read from or written to the dedicated executive function address is the operand of the executive function. The Task Dispatch Check executive function, for example, which determines the identity of the highest-priority task ready for execution, is performed by reading the identity of that task from the address dedicated to the Task Dispatch Check executive function.

The computer hardware executive of the present invention maintains internal executive tables. These tables are also mapped into the host processor address space. This enables them to be initialized by the host processor. They can be read or written like conventional memory. The host processor must not write into them indiscriminately, however, since their contents have a direct bearing on the proper operation of the algorithms implementing the executive functions.

The computer hardware executive of the present invention provides executive functions to control the allocation of space in its internal executive tables. The host processor requests space for a new table entry by executing the Reserve executive function for the table desired. There is one Reserve executive function for each table. The Reserve executive function is executed by reading the index of the table entry being assigned by the hardware executive from the address dedicated to that Reserve executive function. The index is then used by the host processor to form the addresses needed to directly load the table entry. This index can also be used to maintain parallel tables in software for items not handled by the hardware executive. The return of a negative index from the hardware executive indicates that the table is full. The host processor can easily detect a full condition using one of its conditional branch instruction.

The term "task" refers to an independent entity of computing. For example, a computer system permitting many users on different terminals access to the same central processor and other computer resources assigns a unique task to each user's computing since the computing of each user is generally unrelated to the computing of the other users. The term "task management" refers to the process of determining which task obtains access to which computer resource at any point in time.

Two of the hardware executive internal executive tables are used for task management. The first, the task table, contains a table entry for each task. It maintains information needed to determine which task should next gain control of the host processor. Its entries have three fields. The state field indicates whether the task is ready for execution. The priority field indicates the preference the task should have relative to other tasks when it is among several that are ready for execution. The semaphore field identifies the resource which is preventing a waiting task from being ready for execution. Resources are defined by the user. Examples of resources include peripheral devices and segments of programs and data stored in memory.

The other table, called the semaphore table, contains an entry for each resource claimed for exclusive use by a task. Its entries have two fields. The semaphore field identifies the resource claimed. The task field identifies the task making the claim. The semaphore table is used to determine if a resource is available and to identify all the resources claimed by a task that can be made available when a task is terminated.

A task is created in accordance with the present invention by establishing an entry for the task in the internal task table. The index of an empty task table location is obtained by reading the contents of the hardware executive address dedicated to the Reserve Task executive function. This index is used by the host processor to form the memory addresses necessary to directly load the appropriate task table fields for the new task. The return of a negative index indicates that the task table is full.

A task known to the executive is in one of five possible states at any given time, described as follows.

Running: In this state the task is executing on the host processor.

Ready: In this state the task could execute on the host processor.

Waiting: In this state the task cannot execute on the host processor until a resource it desires becomes available.

Suspended-Ready: In this state the task is explicitly prevented from executing on the host processor.

Suspended-Waiting: In this state the task is explicitly prevented from executing on the host processor, but even if this were not the case, it cannot execute on the host processor until a resource it desires becomes available.

The Reserve Task executive function initializes the task table entry to the suspended-ready task state to prevent its consideration for execution until the task table entry can be completely specified. The task state transitions resulting from the various executive functions in accordance with the present invention are depicted in FIG. 1.

The term "dispatching" refers to the process of determining which task should have control of the computer at a given point in time. The determination is based on the contents of the task table. There are many algorithms which may be used to decide which task to dispatch. The Dispatch Check executive function of the present invention selects for dispatch the task having the highest priority from among the tasks in the ready or running task state. The priority is a number supplied by the user which indicates the relative importance of executing the associated task before other tasks when a choice is possible. If two or more tasks of the same priority are in the ready or running task state, they are queued on a first-ready-first-dispatched basis.

The Dispatch Check executive function of the present invention returns to the host processor the task table index, which also serves as the task identifier, of the task that next enters the running task state. The host processor then uses the index to direct the task-to-task context switch. The Dispatch Check executive function returns a negative number to the host processor when no task can be placed in the running task state. The negative condition can be used to direct the host processor to its idle loop.

The Wait-On-Semaphore executive function is used to move a task from the ready or running task states to the waiting task state if a desired resource is not available. For example, a user may desire that only one task at a time have access to a printer. All tasks invoke the Wait-On-Semaphore executive function to determine whether the resource, in this case a printer, is available before attempting access. Resources are identified by a unique user-defined number called a "semaphore". Availability of a resource is indicated by the absence of its semaphore from the internal semaphore table.

The Wait-On-Semaphore executive function first checks the semaphore table to determine whether any other task has previously claimed the resource associated with the semaphore. If the semaphore is found in the table, then the resource is not available. In this case, the state field of the task table entry is changed to move the task from the running state to the waiting state and the semaphore field is loaded with the semaphore on which the task is waiting. If, on the other hand, the semaphore is not found in the semaphore table, then the associated resource is available. The invoking task can remain in the running task state. The Wait-On-Semaphore executive function claims ownership of the resource on behalf of the invoking task by recording the semaphore and task identifiers in an empty location in the semaphore table.

Since the Wait-On-Semaphore executive function has the potential of creating a new entry in the semaphore table, the function must be preceded by a Reserve Semaphore executive function to assure the availability of space. This space is freed by the Wait-On-Semaphore executive function if it turns out not to be needed.

The Signal Semaphore executive function is used to announce that a resource is now available. It searches the task table for the highest priority task waiting on the semaphore specified by the function operand. Once found, the task is moved from the waiting (or suspended-waiting) task state to the ready (or suspended-ready) task state and its semaphore field in the task table is cleared. Finally, the task identifier is loaded into the semaphore table entry associated with the signaled semaphore to claim ownership for the task.

The Suspend Task executive function is used to explicitly exclude the specified task from consideration by the Dispatch Check executive function. If the task is in the ready or running task states, it is moved to the suspended-ready task state. If the task is in the waiting task state, it is moved to the suspended-waiting task state.

The Resume Task executive function is the converse of the Suspend Task executive function. If the task is in the suspended-ready task state, it is moved to the ready task state. If the task is in the suspended-waiting task state, it is moved to the waiting task state.

A task is terminated by first invoking the Suspend Task executive function to properly exclude the task from further dispatch. Then the Terminate Task executive function is invoked. The latter function flags all the semaphores in the semaphore table owned by the specified task. It is followed by repeated invocations of the Release Semaphore executive function. The Release Semaphore executive function returns, one by one, the identity of the semaphores owned by the task being terminated. The host processor uses this information to release the resources owned by the terminated task using the Signal Semaphore executive function. Finally, the content of the task table entry is cleared by direct accesses to the task table address space.

The Wait-On-Semaphore, Signal Semaphore, Suspend Task, and Resume Task executive functions all potentially or actually change the task state. They should by followed by the Dispatch Check executive function since the task previously in the running state may not be ready or have the highest priority.

The term "event" refers to a software or hardware perturbation causing an alteration in the expected sequence of computing. The event concept can be viewed as a generalization of the hardware interrupt concept to include pseudo-interrupts triggered by software.

The computer hardware executive of the present invention distinguishes between normal events and time events. The term "normal event" refers to an event triggered only directly through software invocation of the Cause Event executive function. The term "time event" refers to an event triggered by the expiration of a present time interval as well as by the Cause Event executive function. Time events are either time-critical or non-time-critical. The term "time-critical" refers to a time event which has been specified by the user to demand immediate notification of the hose processor when it occurs. The term "non-time-critical" refers, on the other hand, to a time event that can be checked for occurrence at the convenience of the host processor.

An executive cannot respond to an event unless it has been instructed previously as to what action should be taken when the event occurs. The term "event registration" refers to the process of associating an event or a class of events with a task to be created or a semaphore to be signalled.

The computer hardware executive of the present invention maintains a list of event registrations in its internal event tables. Normal and time event registrations are maintained in separate tables to enlarge the maximum number of events permitted. Normal event table entries contain two fields. The event field contains user-defined information specifying the event or class of events to which the registration applies. The state field whether the event has been triggered. Time event table entries contain the same two fields found in normal event table entries plus two additional fields indicating the time interval remaining before the event is triggered and whether the time event is time critical.

An event is registered by first obtaining an empty event table entry location using either the Reserve Normal Event executive function or the Reserve Time Event executive function depending on the type of event. The functions return to the host processor the event table index of an empty location. The functions mark the selected entry location as reserved but as yet not registered to prevent the entry from being considered by other event executive functions until the appropriate fields of the entry are completely specified. The specification of user-specified fields is performed by direct accesses into the event table entry. Return of a negative index by the functions indicates that the respective table is full.

An event known to the executive has two possible states at any given time.

Armed: This state indicates that the executive is ready to process the event if something causes it to occur.

Triggered: This state indicates that the executive has recognized that the event has occurred.

The event state transitions are illustrated in FIG. 2.

The Cause Event executive function matches the event specified by the function operand with a qualifying event registration in the normal or time event tables. The event table entry selected is then moved from the armed to the triggered event state. The Cause Event function should be followed by the Normal Event Check and the Time Event Check executive function. These functions return the event table index of the highest priority event in the triggered event state and then move the selected event to the armed state. The host processor uses this index to identify the task to be created or the semaphore to be signalled. Return of a negative index indicates that no events in the respective event table remain in the triggered state. Since several time events may be triggered at the same time, the Time Event Check executive function should be repeated until all triggered time events are processed.

The initial time interval associated with a time event is relative to the time that the event was registered. An oscillator in the present invention generates "ticks" which are processed by the hardware executive microprogram. When a tick is detected, the contents of the time interval field of all the armed time event table entries are decremented and tested. Those found to contain zero are moved to the triggered state and their time-critical bit is tested. If the time-critical bit indicates a time-critical event, then an interrupt is generated to notify the host processor that a time-critical event has occurred. Periodic Time Event Check executive functions must be invoked to detect triggering of non-time-critical time events.

The registration of an event is removed using the Cancel Event executive function. This function frees the space occupied by the event table entry.

Most function performed by a software executive implementation consist of the manipulation of tables or linked lists. The implementation of these functions can be viewed as a state machine. In the state machine model, the ESR's are the input, the identity of the next running task is the output, and the content of the various internal tables or linked lists is the machine state. Executive functions are the component algorithms of ESR's used to transform the present state into the next state. This model is illustrated in FIG. 3.

The computer hardware executive of the present invention contains an associative memory for the storage of executive tables. The term "associative memory" refers to a memory which identifies any of its locations containing a value equivalent to a given input. Thus the associative memory of the present invention implements a table search in hardware. The associative memory of the computer hardware executive of the present inventions is designed to permit searches on any bit position or set of bit positions within its locations. This enables the same location to contain a single entry for each of the executive tables.

The associative memory of the present invention is implemented using conventional random access memory (RAM). The RAM is organized such that the same bit position of all associative memory locations is accessed simultaneously. One way to visualize this organization is to view the associative memory as a two-dimensional matrix of bits where rows correspond to words mapped into the host processor address space and columns correspond to words of physical RAM. When the host processor writes directly into the tables, the microprogram of the hardware executive of the present invention serially loads the word from the host processor one bit at a time into the successive physical RAM addresses. Similarly, when the host processor reads directly from the tables, the operand read is collected serially from successive physical RAM addresses. This approach to implementing an associative memory is termed a "bit-serial" associative memory implementation.

Each associative memory location of the present invention has a serial adder/subtracter and a capture flip-flop. The microprogram of the present invention performs searches one bit position per cycle across all associative memory locations simultaneously. Each serial adder/subtracter compares the sought contents with the contents of it respective location. The capture flip-flop, which is cleared at search initialization, is set by the serial adder/subtracter when a bit position fails to match. All capture flip-flops still remaining cleared after all the bit positions of interest have been examined correspond to the locations satisfying the search criterion. A priority encoder connected to the output of the capture flip-flops identifies the location with the lowest location address from among those satisfying the search criterion. It is used when only a single location satisfying the search criterion is desired, such as when a table index is returned to the host processor.

Searching for the location whose given field contains numerically the lowest value follows a similar process. The search proceeds from the most-significant to the least-significant bit position of interest. Special circuitry in the present invention is enabled which prevents any of the capture flip-flops from being set by a microinstruction cycle if so doing would leave all capture flip-flops set. The Dispatch Check executive function uses this type of search to find the highest priority task for the running task state. High priority is represented by a low positive numeric value.

Queues within user priority levels are implemented by extending the user priority field with a queue priority field consisting of bits of lesser numeric significance. Tasks entering the queue receive progressively lower queue priority assignments. Tasks leaving the queue cause the queue priority of all the tasks of lower queue priority to be adjusted upward. The adjustment is efficiently handled by the serial adder/subtracters. This technique prevents overflow of the queue priority field.

The computer hardware executive of the present invention performs internal table searches by sequentially examining each bit position of all table entries simultaneously. The search time depends on the number of bits in the table fields and not on the number of entries in the table. Faster execution is obtained because the number of bit positions examined is usually smaller than the number of table entries. This simplifies system design by removing the variability in execution speed of the executive functions.

The hardware executive of the present invention reduces context switching. The term "context switching" refers to a form of overhead encountered when resources occupied by one program, typically the processor and memory management registers, are transferred to another program. One source of context switching is the transfer from the application software to the executive software and back again. Hardware implementation of the executive reduces context switching by providing separate resources for the executive which are independent of those used by the application software. Another source of context switching results from the requirement for re-entrant executive functions. An executive function is made re-entrant to permit its preemption by an interrupt handler desiring use of the same executive function. Executive functions of the computer hardware executive of the present invention have been specifically designed such that an interrupt between a sequence of executive functions does not disrupt their proper operation.

The computer hardware executive of the present invention is connected to the host processor in the same manner as a conventional memory. Executive functions are selected by accessing the appropriate address within the hardware executive address space. This "memory mapped" interface permits simple retrofit of the hardware executive to existing computers since there is no need to augment or modify the host computer instruction set. The same basic hardware executive unit can be attached to a large variety of different processor designs while only the memory interface logic changes from design to design. The memory mapped interface also provides the ability to share a common hardware executive among several processors. Like shared memory, the hardware executive address space is configured to be accessible to each processor.

OBJECTS OF THE INVENTION

Accordingly, it is the primary object of the present invention to disclose a special-purpose associative processor for providing high-speed execution of computer executive functions.

It is a concomitant object of the present invention to disclose a machine for implementing computer executive functions which eliminate most context switching between the application processing and the executive and between the executive and itself.

It is another object of the present invention to disclose a mechanism for performing computer executive functions which utilizes an associative memory to thereby achieve high-speed execution.

A further object of the present invention is to disclose a mechanism for implementing computer executive functions by examining a single bit position of all table entries simultaneously whereby the search time is the same regardless of the number of active table entries.

Still another object of the present invention is to disclose a computer executive function implementing mechanism for use with a host computer which requires no augmentation or modification of the host computer instruction set thereby enabling retrofit of the computer hardware executive of the present invention to existing computers.

DESCRIPTION OF PREFERRED EMBODIMENT

Figure 4:
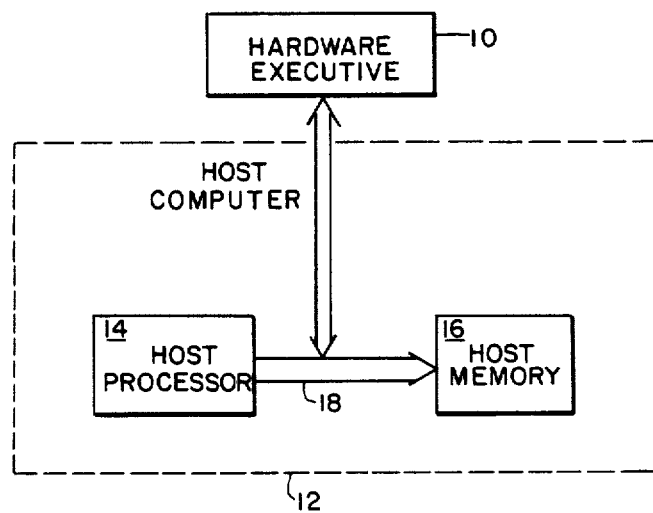
FIG. 4 is a block diagram of the computer hardware executive of the present invention showing its interconnection with the host processor.

The design of the computer hardware executive of the present invention is functionally divided into four parts: The associative memory logic section, the memory selection logic section, the register logic section, and finally, the microsequence control logic section. The computer hardware executive 10 of the present invention is shown in FIG. 4 as it is connected to the host computer 12. The host processor 14 of the host computer 12 is connected to its host memory section 16 via the memory bus 18. The computer hardware executive 10 of the present invention connects directly to the memory bus 18 of the host computer 12.

Figure 5:
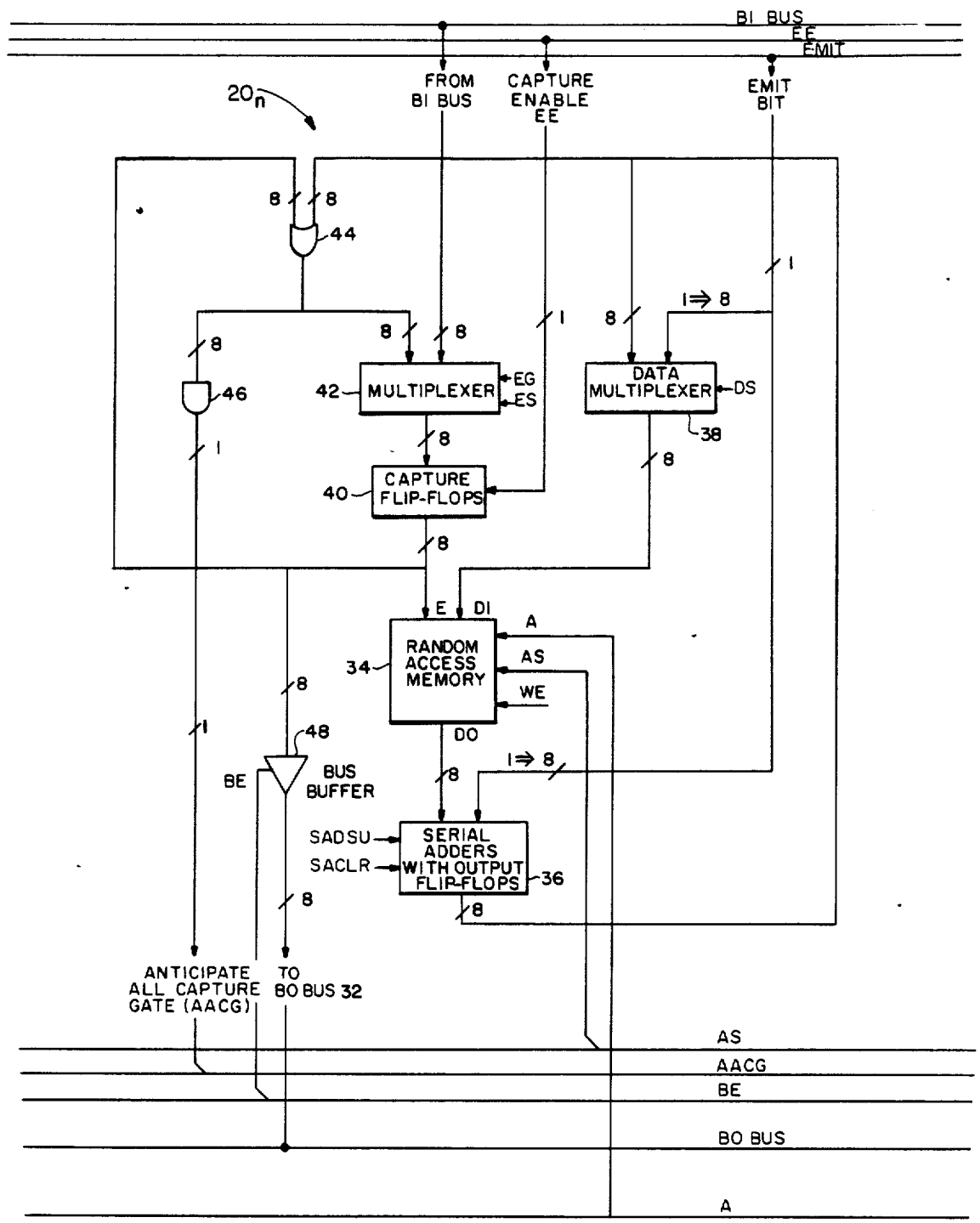
FIG. 5 is a block diagram of one of the associative memory logic banks of the present invention.
Figure 6:
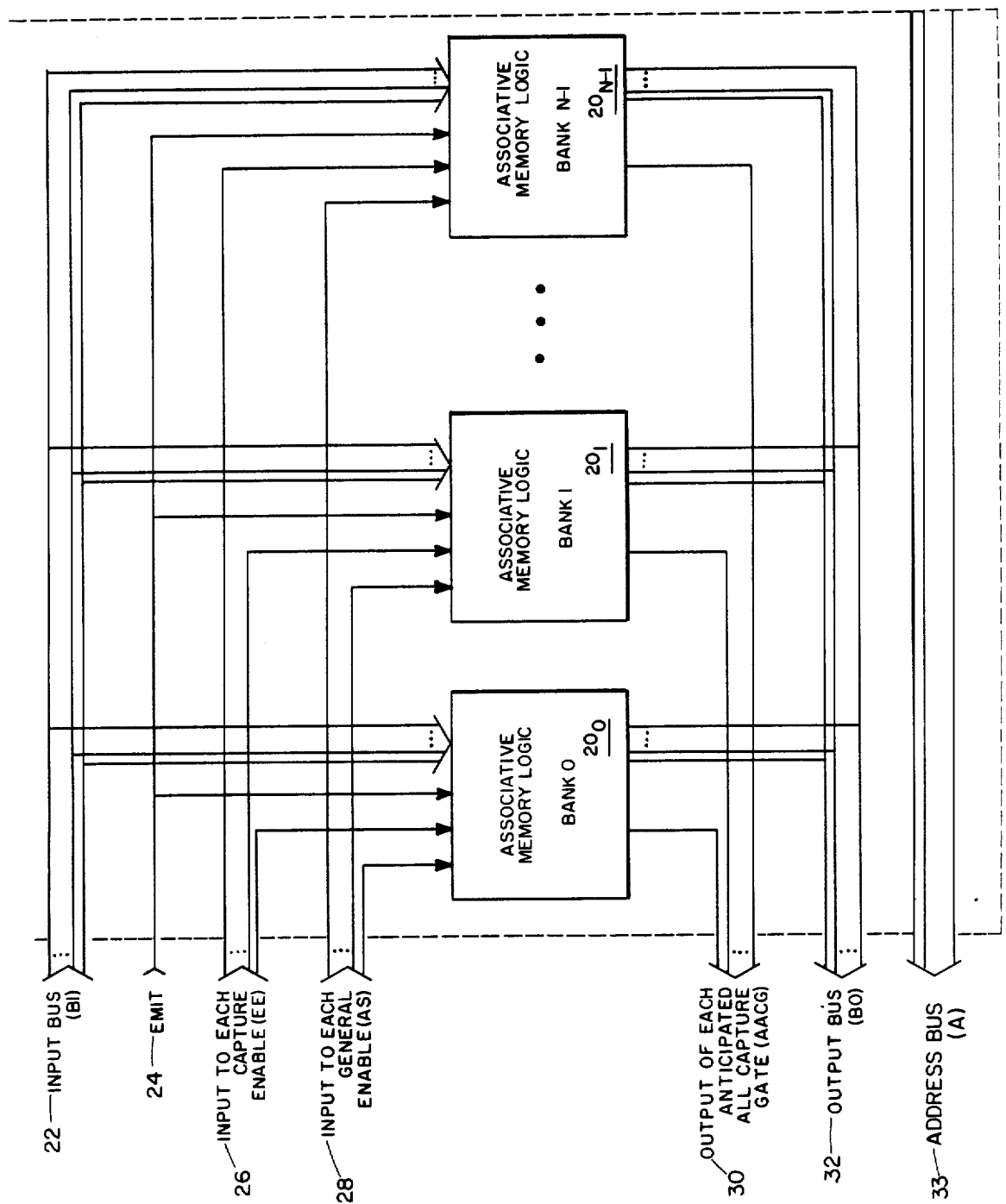
FIG. 6 is a schematic block diagram illustrating how the associated memory logic banks of the present invention are interconnected to each other and to the various busses utilized in the present invention.

The associative memory logic portion of the present invention is used to implement the storage and search of executive tables. A block diagram of the associative memory logic banks 20(n) of the present invention is illustrated in FIG. 5. In the preferred embodiment there are eight associative memory logic banks identical to the one depicted in FIG. 5. It is understood at this point that, although the preferred embodiment of the present invention utilizes eight banks of associative memory, a fewer or greater number of such banks may be utilized in accordance with the particular requirements of the application to which the invention is applied. Each of the associative memory logic banks 20(0), 20(1), . . . 20(N−1) are interconnected by the system of busses as illustrated in FIG. 6. More particularly, each associative memory logic bank 20(n) is connected to the input BI bus 22, to the EMIT bus 24, to the capture enable EE bus 26, to the general enable AS bus 28, to the anticipated all capture gate AACG bus 30, to the output BO bus 32, and finally to the address A bus 33.

Part of each associative memory logic bank 20(n) is a random access memory RAM 34. The RAM 34 is constructed to provide independent read/write control of each bit position of the addressed word. This is accomplished by using a separate memory component for each bit position. It is noted that each bit position has an independent data input, DI, data output, DO, write enable, WE, and general enable, E. All of the bits of the addressed word share the same address input A and common general enable AS. The write enable, WE, and both general enables, E and AS, must all be in the logic true state for data to be written. The write enable must be in the logic false state and both general enables must be in the logic true state for data to be read. When these conditions are not met, the data output, DO, is in the logic one state.

The associative memory logic banks 20(n) are associative memories, and more particularly, bit-serial associative memories having the capacity to read from and write to internal locations like conventional memory, to search for the locations having a particular content in a particular location field, and to search for the locations with the minimum positive numeric value. A bit-serial associative memory is an associative memory constructed such that it accesses a single bit position of all locations simultaneously and performs its functions by sequencing through the bit positions serially. The bit-serial associative memory of the present invention is controlled by a microprogram.

Each of the RAM 34 data outputs, DO, provides a data path for reading the content of the bit position selected by the RAM address input, A, for a particular associative memory location. Each of the RAM 34 data outputs, DO, is connected to one input of an independent serial adder/subtracter 36. The other input of these serial adder/subtracters 36 is connected to the common signal referred to previously as the EMIT bit. Each serial adder/subtracter 36 contains an output flip-flop for synchronization of the output with the system clock.

Each RAM 34 data input, DI, is connected to the output of an independent output of a data multiplexer 38. The data multiplexer 38 selects for all associative memory locations simultaneously either the output of the respective serial adder/subtracter 36 or the common EMIT bit.

The general enable E of the RAM 34 associated with each associative memory location is connected to the output of an independent flip-flop called a capture flip-flop 40. When the common general enable AS is true, the presence of logic zero and logic one in the capture flip-flop 40 enables and disables the associated memory location, respectively. When an associative memory location is disabled, attempts to read to or write from the associative memory location are ignored and the data output, DO, is in the logic one state regardless of the location bit position content. The capture flip-flops 40 are clocked whenever the common capture flip-flop enable input, EE, is true.

The data inputs of the capture flip-flops 40 are connected to the output of another multiplexer 42. This multiplexer 42 selects for all capture flip-flops 40 simultaneously either the output of the serial adder/subtracter 36 logical OR'ed with the previous output of the capture flip-flops 40 via the OR gate 44 for each respective associative memory location, an independent input BI bus for the respective associative memory location within the associative memory bank, or zero. The first of these selections permits the occurrence of a logic one generated by the respective serial adder/subtracter 36 to be "captured", that is, to remain in the capture flip-flop for successively cycles. The other two multiplexer 42 selections are used to initialize the capture flip-flops 40.

The outputs of the OR gates 44 are connected to an AND gate called the anticipated all capture gate 46, AACG. The output of the anticipated all capture gate 46 is in the logic true state if and only if the output of each capture flip-flop 40 OR'ed with the output of respective serial adder/subtracter is a logic one for all associative memory locations of the associative memory logic bank 20($n$).

The outputs of the capture flip-flops 40 are connected to respective bus buffers 48 permitting their output to be logically connected or disconnected to the output BO bus 32. This connection or disconnection is controlled by the buffer enable, BE. The output BO bus 32 is comprised of independent signals for each respective associative memory location of an associative memory logic bank 20($n$). In the preferred embodiment, the bus buffers 48 are implemented from three-state buffer components. It is noted that the bus buffers 48 may be implemented with three-state buffers, open-collector buffers, open-emitter buffers, or multiplexers.

As shown in FIG. 6, the associative memory logic portion of the present invention is partitioned into N identical associative memory logic banks. Each associative memory logic bank 20($n$) contains a segment of the total memory word addressed by the common address lines 33, A. As stated above, two busses, the input BI bus 22 and the output BO bus 32 interconnect the associative memory logic banks 20($n$). The general enables AS inputs 28 and the anticipated all capture gate 46 AACG outputs for each associative memory logic bank 20($n$) remain independent permitting the banks to be selected and examined individually.

As described previously, the associative memory locations of the computer hardware executive 10 are mapped into the host processor 14 address space. This enables the host processor 14 to load and to examine the content of the executive tables maintained by the computer hardware executive 10. The host processor 14 loads a segment of an associative memory location by writing into the address dedicated to that segment in the host processor address space. The host processor 14 provides the address of the segment and the contents to be loaded. Associative memory location segments are loaded serially, that is, each bit forming the segment is loaded on a separate microinstruction cycle. A bit position multiplexer, to be described, selects from among the various bit positions in the exchange register, to be described (see FIG. 11), the bit to be loaded on each microinstruction cycle into the memory component implementing the associative memory location.

The serial adder/subtracters 36 compare two serial bit streams, each pair of bits forming the bit streams being compared in a separate microinstruction cycle. More particularly, the number represented by the bit steam entering the serial adder/subtracter 36 from the respective data output DO of each RAM 34 memory component is compared with the number represented by the bit stream entering the respective serial adder/subtracter 36 from the EMIT input. The comparison is performed by subtracting one bit stream from the other, and if the resulting bit stream contains only logic zero bits, the two input bit streams are equal. The serial adder/subtracters 36 also have the capacity to increment or decrement a bit stream. This is accomplished by adding or subtracting a bit stream representing the number one via the EMIT input to or from the data output DO respectively.

In the preferred embodiment each associative memory logic bank 20($n$) has eight associative memory locations. Since, in the preferred embodiment, there are eight associative memory logic banks 20($n$), this gives a total of sixty-four associative memory locations in the preferred embodiment. Sixty-four associative memory locations in the preferred embodiment. It is to be understood, however, that other numbers of associative memory locations may be utilized upon the particular requirements of the application. The signals from the input BI bus 22 are used to initialize and load all enabled associative memory locations simultaneously. In this embodiment, therefore, there are eight wires from the input BI bus 22 leading from multiplexer 42, one wire for each associative memory location contained within a single associative memory logic bank. These wires are indicated by the notation on the line connecting the input BI bus 22 to the multiplexer 42 as is illustrated in FIG. 5.

The capture enable signal EE is a signal which enable or disables the clock of all the capture flip-flops 40. For example, if it is desired that the capture flip-flops not change their state regardless of what is coming from the multiplexer 42, turning off the enable EE prevents any change in the state of the capture flip-flops 40. When the capture enable signal EE disables the clock to the capture flip-flops 40, the capture flip-flops 40 ignore any information at their input and retain their previous state.

Figure 11:
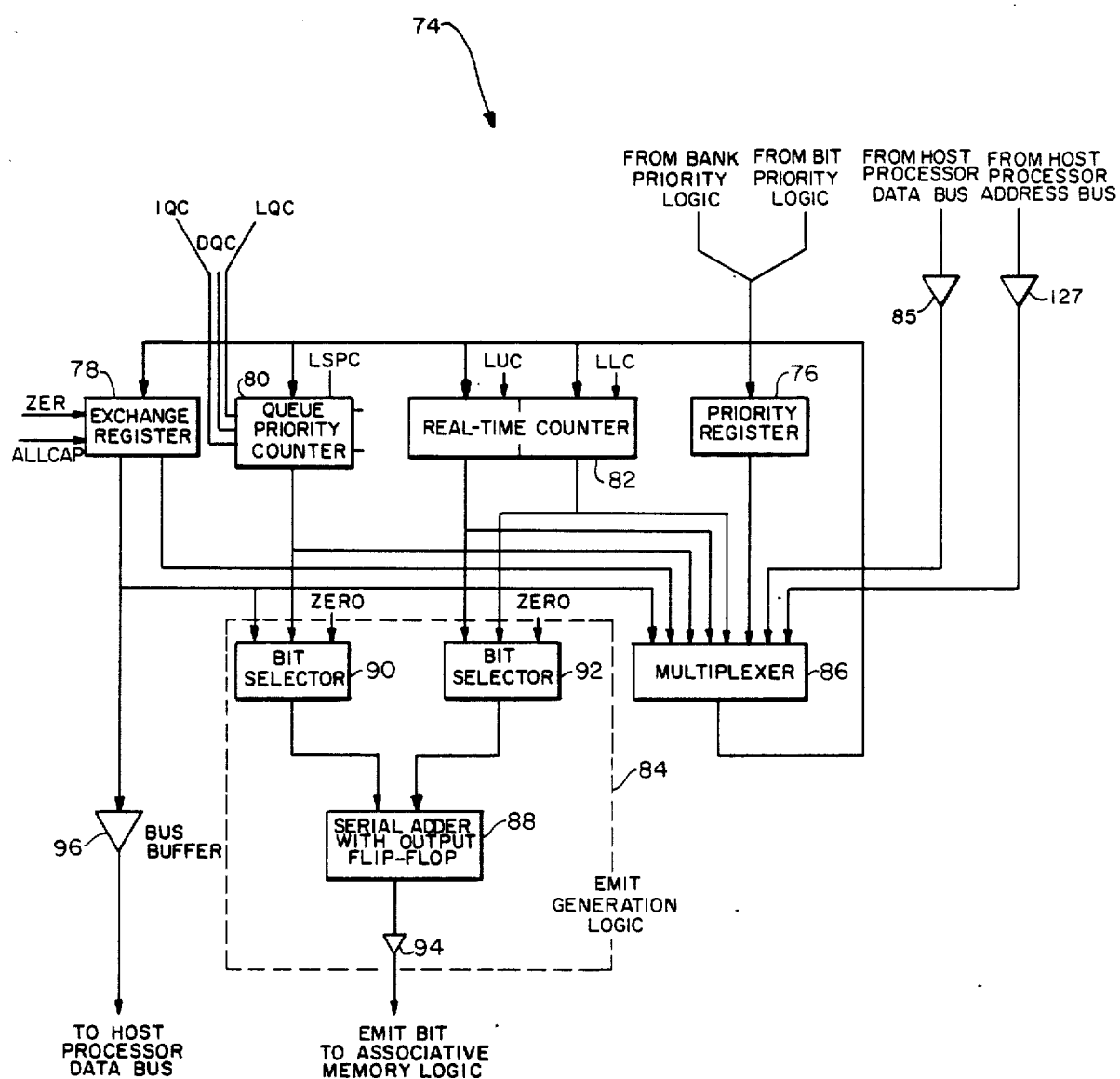
FIG. 11 is a block diagram of the register logic portion of the present invention.

The EMIT bit signal is a single bit per microinstruction cycle generated by the bit position selector, to be described, of the register logic portion of the present invention, to be described (see FIG. 11). This EMIT bit signal provides the bit being compared by the serial adder/subtracters to the bit supplied by each respective memory component implementing an associative memory location.

It is noted at this point that the output of each of the eight OR gates 44 is connected to the input of a separate data path through multiplexer 42, and that the input of each OR gate 44 is connected from the output of the respective capture flip-flop 40. These connections are provided to implement the "capture" function of the capture flip-flops 40. The multiplexer 42 selects either the output of the OR gates 44 or the input from the input BI bus 22. The capture function is implemented as follows. Initially, the multiplexer 42 is set so that the input BI bus 22 can load a zero into the capture flip-flop 40. Then, on each of the succeeding microinstruction cycles, the multiplexer 42 is set to the other position so that the output of the serial adder/subtracter 36 through the OR gate 44 can be clocked into the capture flip-flop 40. The capture function is implemented by first initializing the capture flip-flop 40 to logic zero through the input BI bus, and then in successive microinstruction cycles, loading the capture flip-flop 40 with the logical OR, using OR gate 44, of the previous state of the capture flip-flop 40 and the comparison output from the serial adder/subtracter 36. If the numbers being compared are equal, then the output generated by the serial adder/subtracter 36 is a bit stream containing only logic zero bits. This means that the output of the OR gate 44 is the logical OR of the zero bit from the serial adder/subtracter 36 and the zero bit from the initialization of the capture flip-flop 40 for all microinstruction cycles of the comparison. The capture flip-flop 40, which is loaded with the output of the OR gate 44, remains zero. If, on the other hand, the numbers being compared differ, then at least one of the bits of the serial bit stream output generated by the serial adder/subtracters 36 is a logic one. This means that the output of the OR gate 44 is the logical OR of the previous content of the capture flip-flop 40 and, for at least one microinstruction cycle, a logic one from the serial adder/subtracter. The capture flip-flop 40 is thus set by the one from the serial adder/subtracter 36, and remains set by the one from its own previous output on the succeeding microinstruction cycles.

The output of each of the eight OR gates 44 is connected to one of the inputs of a single AND gate 46. The output of AND gate 46 is logic true if and only if the outputs of all the OR gates 44 are in the logic one state. This information is used to determine whether all the associative memory locations in a particular associative memory logic bank 20(n) have all their capture flip-flops 40 in the logic one state or will have all their capture flip-flops 40 in the logic one state on the next microinstruction cycle if the capture flip-flops 40 clock were enabled. It is noted at this point that the AND gate 46 inputs are wired from the OR gate 44 outputs, not from the output of the capture flip-flops 40, in order that the AND gate 46 can anticipate when the capture flip-flops 40 will be set to the all logic one state. For this reason, the AND gate 46 is called the "anticipated all capture gate" (AACG).

Figure 7:
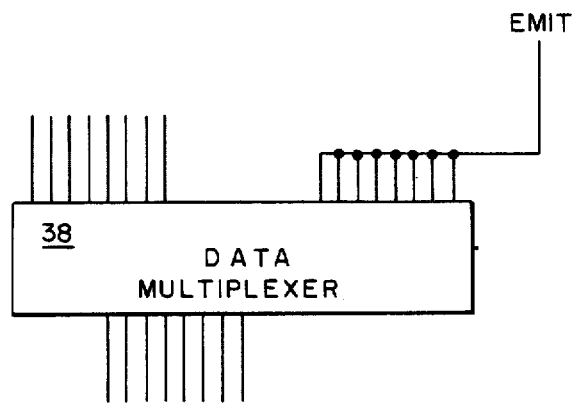
FIG. 7 is a block diagram of the data multiplexer utilized in each associative memory logic bank of the present invention, illustrating the connection of the EMIT bit to the data multiplexer.

As previously stated, the data multiplexer 38 selects between the EMIT bit and the output of the serial adder/subtracter 36 of each respective associative memory location. The path from the EMIT bit is used so that the value of the EMIT bit can be directed through the multiplexer 38 into the data DI input of the RAM 34. This is how the function of writing into a location is accomplished. The other input to multiplexer 38, from the output of the serial adder/subtracters 36, is used when it is desired to increment or decrement the content of fields of the associative memory locations. It is noted that there are eight output from the serial adder/subtracter 36, one for each associative memory location of the associative memory logic bank, and therefore there are eight inputs to one port of the multiplexer 38. Since the EMIT bit is only a single bit, it is wired into each of the eight input to the other port of multiplexer 38. These connections are illustrated in detail in FIG. 7 wherein multiplexer 38 is seen receiving the EMIT bit wired to each position of one of the multiplexer ports. It is also noted at this point that bus buffer 48 is utilized to extract the output values of the capture flip-flops 40.

The memory selection logic portion of the present invention will now be described. The memory selection logic 50 of the present invention interconnects the associative memory logic banks 20(n) of the associative memory portion of the present invention via the input BI bus 22 and output BO bus 32, and the independent signals, AS, BE, EE, and AACG, of each associative memory logic bank 20(n). The memory selection logic 50 is comprised of two functional sections, the bank selection logic section 52 and the bit selection logic section 54.

The bank selection logic section 52 is used to control the activation of the associative memory logic banks 20(n) by generating an independent general enable AS for each associative memory logic bank 20(n). It also activates one of the independent output bus buffer enables BE to logically connect the output of the capture flip-flops 40 of a single associative memory logic bank 20(n) which it selects for input to the bit selection logic section 54. Similarly, the bit selection logic section 54 control the activity of the individual associative memory locations within each associative memory logic bank 20(n).

Internally, the bank selection logic section 52 contains a bank capture flip-flop 56 for each associative memory logic bank 20(n). The output of each bank capture flip-flop 56 is connected to the respective bank general enable AS. As is the case of the associative memory logic capture flip-flops 40, flip-flop contents of zero and one are defined as enable and disable, respectively. The memory component implementing a particular associative memory location within an associative memory logic bank 20(n) is enabled for reading and writing only if both its associative memory logic capture flip-flop 40 and its bank capture flip-flop 56 contain zero.

Bank multiplexer 58 supplies the input to the bank capture flip-flops 56. The multiplexer 56 selects either the output of the bank priority logic 60, the output of the bank decoder 62, or zero.

Figure 10:
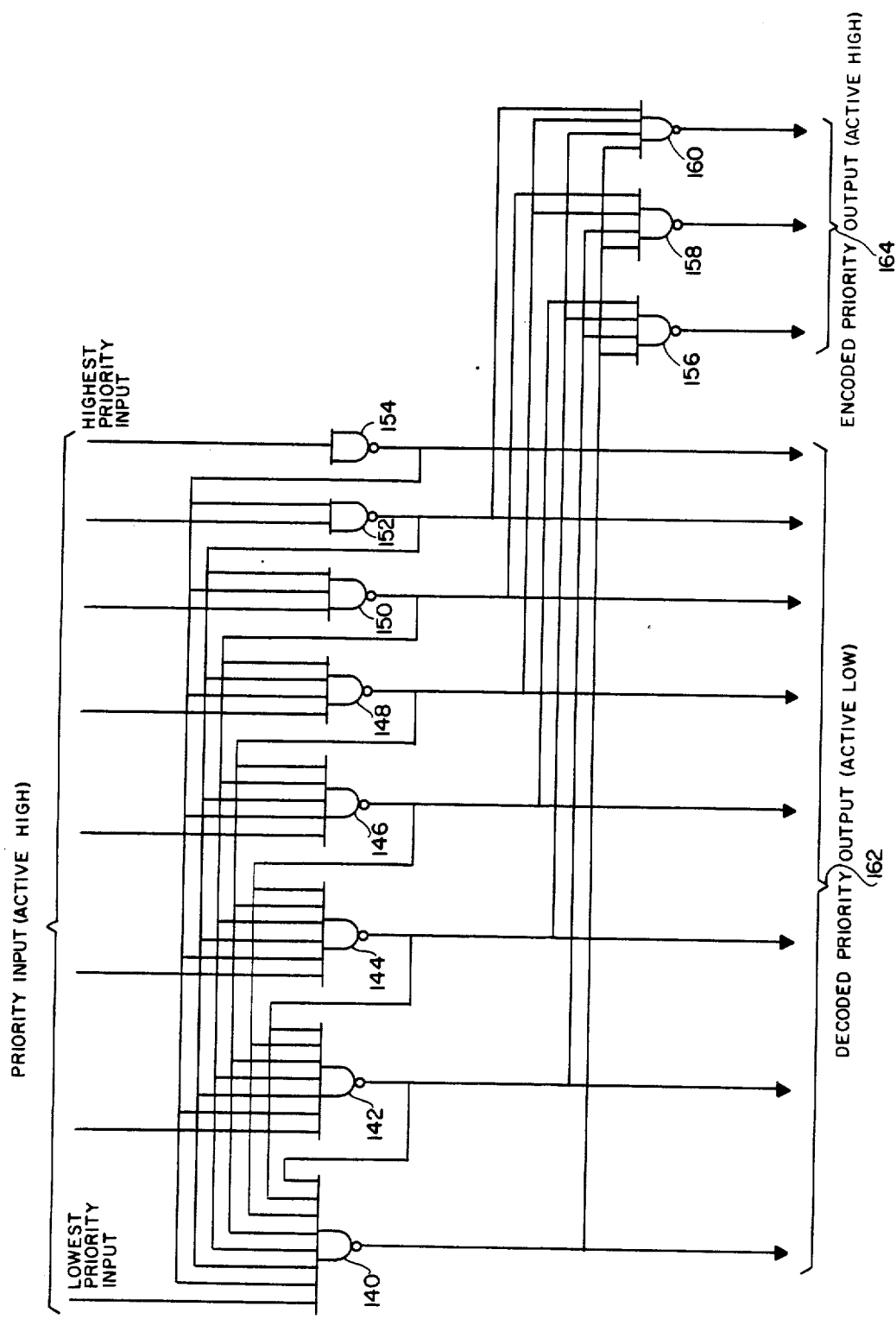
FIG. 10 is a block diagram of the bank and bit priority logic components of the present invention.

The bank priority logic 60 is used to determine the highest-priority bank containing at least one associative memory logic capture flip-flop 40 in the zero state. The inputs to the bank priority logic 60 are the independent outputs of the anticipated all capture gates AACG 46 from each associative memory logic bank 20(n). The anticipated all capture gate AACG signals pass through the anticipated all capture pipeline register for synchronization with the next microinstruction cycle. Both encoded and decoded priority output is provided by the bank priority logic 60. An eight-input gate-level implementation of the bank priority logic 60 is illustrated in FIG. 10 and will be described in detail below. The encoded output provides the most-significant input to the priority register and register logic to be described. The bank capture flip-flop input bank multiplexer 58 uses the decoded output. The decoded output also provides as independent output bus buffer enable BE to control buffer 48 of each associative memory logic bank 20(n).

The bank decoder and "zero" selections of bank multiplexer 58 are used to initialize the bank capture flip-flops 56. The bank decoder 62 is constructed such that the bits forming the decoded output are all ones except the output addressed by a field of the exchange register within the register logic to be described. This path permits the contents of the exchange register, to be described (See FIG. 11), to address a single associative memory logic bank 20(n) directly by loading all the bank capture flip-flops 56 with ones expect the bank being addressed by the content of the exchange register.

As stated previously, the bit selection logic section 54 is used to control the activity of the individual associative memory locations within each associative memory logic bank 20(n). This is accomplished through the input BI bus 22 and the output BO bus 32 which interconnect all the associative memory logic banks 20(n) in parallel.

The bit selection logic section 54 contains a bit decoder 64 driven by another field of the exchange register of the register logic portion to be described (See FIG. 11). The output of the bit decoder 64 is logically connected to the output BO bus 32 through its own bus buffer 66 which is compatible with the associative memory logic output bus buffers 48. In the preferred embodiment these buffers are three-state buffers which are well known. The output bus buffer 48 selected by the bank selection logic section 52 is forced to disconnect when the bit decoder output bus buffer 66 is enabled. This is accomplished by the control signal BDE. The bit decoder 64 works in conjunction with the bank decoder 62 so that a single associative memory location within a single associative memory logic bank 20(n) can be addressed by the content of the exchange register of the register logic to be described.

The bit selection logic section 54 also contains a bit priority logic circuit 68. This bit priority logic 68 is designed in the same manner as the bank priority logic 62 and is depicted in FIG. 10 to be described. The bit priority logic 68 prioritizes the bits found on the output BO bus 32. Its decoder output directly drives the input BI bus 22. Its encoded output generates the least-significant input to the priority register of the register logic portion to be described.

When an address of an associative memory location is placed in the exchange register of the register logic portion (See. FIG. 11), it must be decoded to select the appropriate associative memory logic bank 20(n) and the appropriate associative memory location within the selected bank. The address in the exchange register is split such that the most-significant bits of the address are connected to the bank decoder 62 and the least-significant bits of the address are connected to the bit decoder 64.

The bit decoder takes, in the preferred embodiment where there are eight associative memory locations per associative memory logic bank 20(n), a three-bit number and converts it into a one-of-eight output, more particularly, an output such that all bits are one except the bit corresponding to the associative memory location within the associative memory logic bank 20(n) being addressed. The output of the bit decoder is logically connected through bit decoder output bus buffer 66 to the output BO bus 32. The output of bit decoder output bus buffer 66 is also provided to the input of the bit priority logic 68. From the output of the bit priority logic 68, the bus buffer 66 output bits are passed to the input BI bus 22. The bit priority logic output selects as its one-of-eight output the same bit as its one-of-eight input. Thus, all the bits on the input BI bus 22 are ones except for the bit corresponding to the associative memory location within the associative memory logic bank 20(n) being addressed.

The input BI bus 22 is connected to all the associative memory banks 20 in parallel. Under microprogram control, to be described, the content of the input BI bus 22 is sent through multiplexer 42 (FIG. 5) to the capture flip-flops 40 of all associative memory logic banks 20. The output of the capture flip-flops 40 are the same as their input after the occurrence of the clock. Since the same input BI bus 22 content is clocked into the capture flip-flops 40 of all associative memory logic banks, one capture flip-flop in each associative memory logic bank 20(n) will contain zero and all the rest will contain one. The capture flip-flop containing zero is used to enable the associative memory location only in the bank selected by the most-significant bits of the exchange register, as shall be described. The output of each capture flip-flops 40 is connected to the enable input E of the corresponding RAM 34. If the enable input E is a one then the RAM will not permit its contents to be altered and will always generate an output of one. All the capture flip-flops 40 containing one thus disable their corresponding RAMs 34 implementing their corresponding associative memory locations. Only the RAMs 34 whose enable inputs E are zero have the potential of being accessed.

All associative memory logic banks 20(n) are connected to the same input BI bus 22 which means that the capture flip-flops 40 in each of the banks 20(n) will attempt to enable the location corresponding to the three least-significant bits which were provided originally from the exchange register. To select only the associative memory location in the bank specified by the most-significant bits from the exchange register, the RAMs 34 implementing each associative memory location have two enable inputs. One of these input is the enable input E described above. The other enable input, called the AS input, is connected to all the RAMs 34 of a single associative memory logic bank in parallel. Each RAM 34 implementing an associative memory location in enabled only if both the enable input E and the enable input AS are zero. If either or both are one, the RAM 34 for that location is disabled, thus preventing its contents from being altered and forcing its output to be one. The AS enable inputs are used to select the appropriate associative memory logic bank 20(n). With enable AS selecting the appropriate bank and enable E selecting the appropriate location with the banks, and single location within a single bank can be selected. The bit selection logic section 54 enable the appropriate enable E for the corresponding location within each bank 20(n) but only one bank is enabled because enable AS is generated by the bank selection logic section 52. The combination of the bit selection logic section 54 and the bank selection logic section 52 effectively restricts the selection down to a single associative memory location.

The three least-significant bits, in the preferred embodiment, go into the bit selection logic section 54 and the next three most-significant bits go into the bank selection logic section 52. The bank decoder converts the three most-significant bits into a one-of-eight signal such that one of the outputs is zero and the rest are one. The output of zero corresponds to the bank to be enabled. The output of the bank decoder 62 goes through the bank multiplexer 58 to the bank capture flip-flops 56. There is a single bank capture flip-flop for each associative memory logic bank 20(n) The output of each bank capture flip-flop 56 is connected to the respective enable AS input of the RAMs 34 implementing the associative memory locations for that associative memory logic bank 20(n).

The output BO bus 32 accesses the output of the capture flip-flops 40 via the bus buffer 48. In the preferred embodiment, the bus buffer 48 is a three-state buffer. When the bus buffer 48 is turned on, the contents of the capture flip-flops 40 are connected to the output BO bus 32. No more than one bus buffer 48 is turned on at any given time since the output BO bus 32 is capable of transferring the content of only one associative memory logic bank 20(n) at any given time.

In addition to the bus buffer 48 from each associative memory logic bank 20(n), the bus buffer 66 of the bit selection logic section 54 (FIG. 8) is also attached to the output BO bus 32. When bus buffer 66 is turned on, the output of the bit decoder 64 is connected to the output BO bus 32. Since the output of only one bus buffer can be logically connected to the output BO bus 32 at any given time, all bus buffers 48 of the associative memory banks 20 (n) are forced to be off when the control signal BDE, to be described, turns on the bit decoder bus buffer 66.

The technique whereby the present invention selects a unique location within the associative memory when more than one location satisfies a test condition, a situation existing when the capture flip-flop 40 of more than one location is in the zero (location enabled) state, is as follows. As in the case for the selection of a single location addressed by the exchange register described previously, the process of selecting a unique location from among those locations whose capture flip-flops 40 are in the zero state consists of first identifying a unique associative memory logic bank 20(n) containing one or more candidate locations, and then identifying a unique location within that bank. In the preferred embodiment, three bits are generated to identify the selected associative memory logic bank 20(n) and three bits are generated to identify the selected location within that bank. The two three-bit numbers are concatenated to form a six-bit result identifying a unique location among all locations. The process of selecting a unique associative memory location from all those locations whose capture flip-flops 40 are set is called prioritization.

There are two outputs from each associative memory logic bank 20(n) which may be seen at the lower left-hand corner of FIG. 5. The first is a single-bit output from an AND gate called the anticipated all capture gate 46 (AACG). The AACG 46 outputs from the respective associative memory logic banks 20(n) are collected at the bank selection logic section 52 where the selection of a unique bank is made. The second output is from the output bus buffer 48 and consists of a single bit from the capture flip-flop 40 of each associative memory location provided by a single associative memory logic bank 20(n). In the preferred embodiment there are eight locations per associative memory logic bank 20(n), and hence, eight bits of bus buffer 48 output and eight parallel binary signals comprising the output BO bus 32. The output of the bus buffer 48 of the associative memory logic bank 20(n) selected by the bank selection logic section 52 is transferred over the output BO bus 32 to the bit selection logic section 54 where the selection of a unique location within the selected bank is made.

Figure 8:
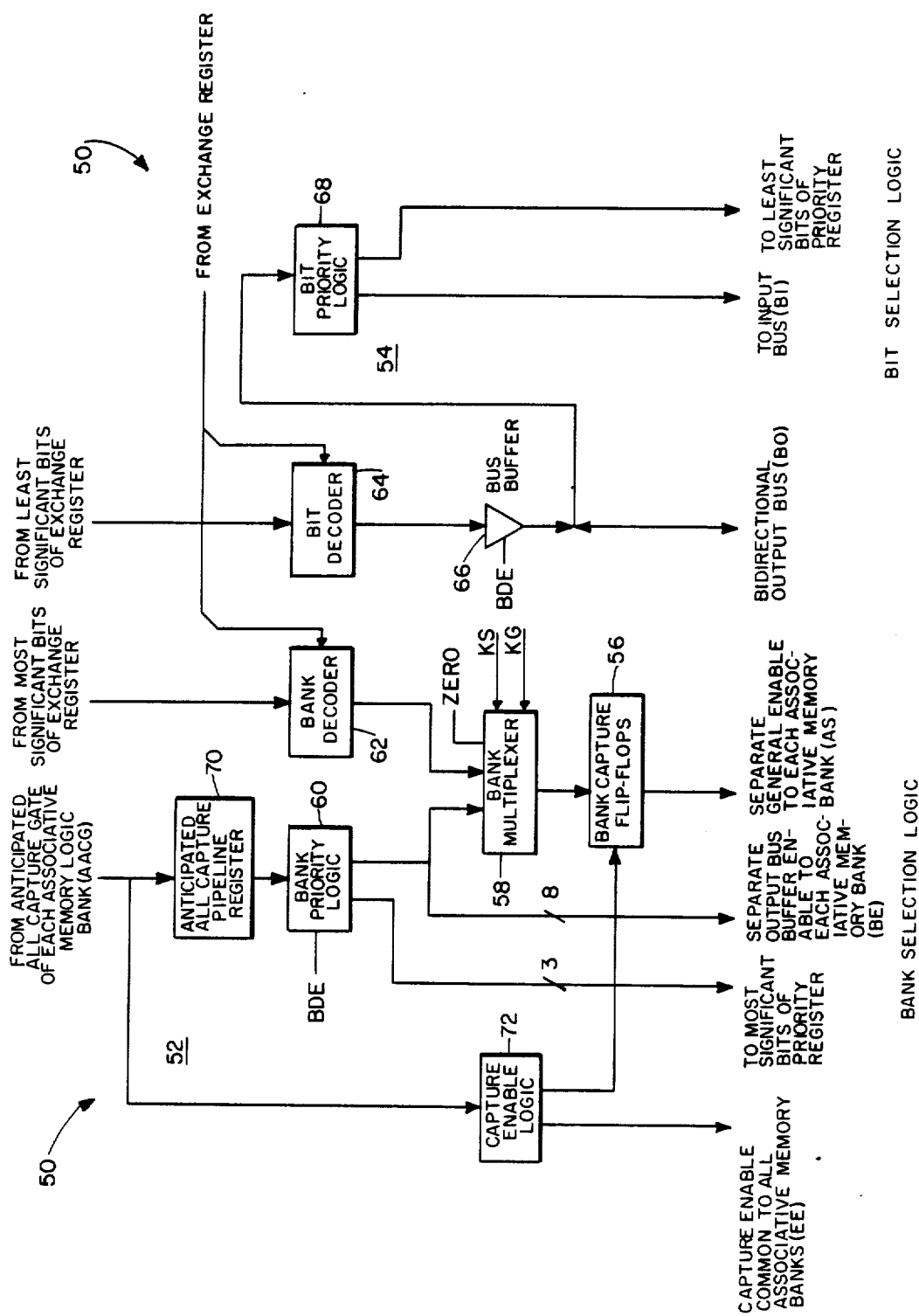
FIG. 8 is a block diagram of the memory selection logic portion of the present invention.

The output of the anticipated all capture gates (AACGs) 46 of the associative memory logic banks 20(n) are collected and connected to independent input bits of the anticipated all capture pipeline register 70 of the memory selection logic 50 (FIG. 8. The purpose of the anticipated all capture pipeline register 70 is to synchronize the AACG outputs with the system clock. Only those bits corresponding to associative memory logic banks 20(n) which have at least one of their capture flip-flops 40 in the zero state are activated. The output of the anticipated all capture pipeline register 70 feeds the bank priority logic 60. The bank priority logic 60 has a decoded output and an encoded output. The decoded output consists of a bit corresponding to each bit of bank priority logic input. The bank priority logic 60 is designed such that no more than one decoded output bit is activated at any given time and the activated decoded output bit is selected from among those whose corresponding input bits are activated. The encoded output is a number representing the address of the associative memory logic bank 20(n) whose associated decoded output bit is activated. It is this encoded output which uniquely specifies the selected associative memory logic bank of the prioritize function. The encoded output of the bank priority logic 60 is connected to the most-significant input bits of the priority register to be described (FIG. 11). In the preferred embodiment there are eight associative memory logic banks 20(n), and hence, eight AACG outputs, eight-bits in the anticipated all capture pipeline register, eight bits of input to the bank priority logic, eight bits of bank priority logic decoded output, and three bits of bank priority logic encoded output (since eight log base two is three).

Each bit comprising the decoded output of the bank priority logic 60 is connected to the respective associative memory logic bank 20(n) output bus buffer 48 enable. Only the single decoded output bit which is activated will enable the corresponding bus buffer 48 connecting the capture flip-flops 40 of that associative memory logic bank 20(n) to the output BO bus 32. The activated decoded output of the bank priority logic 60 is used turn on the bus buffer 48 of the now unique associative memory logic bank. In other words, the only associative memory logic bank 20((n) that is connected to the output BO bus is the one selected by the bank selection logic section 52.

Now that a unique bank has been selected, the selection of a unique location within the selected bank is performed as follows. The outputs of all the capture flip-flops 40 of the selected associative memory logic bank 20(n) are connected to the output BO bus 32 by the bank selection logic section 52 as previously described. The output BO bus is directly connected to the bit priority logic 68 of the bit selection logic section 54. The bit priority logic 68 is a circuit similar to the bank priority logic 60, differing only in that the BDE signal which forces all the decoded outputs of the bank priority logic 60 to the deactivate state when the bit decoder bus buffer 66 is turned on is not present. The circuit used in the preferred embodiment is illustrated in FIG. 10. It has a decoded output and an encoded output. The decoded output consists of a bit corresponding to each bit of the bit priority logic input. The bit priority logic 68 is designed such that no more than one decoded output bit is activated at any given time and the activated decoded output bit is selected from among those whose corresponding input bits are activated. The encoded output is a number representing the address of the location within the selected associative memory logic bank 20(n) whose associated bit in the decoded output is activated. The encoded output of the bit priority logic 68 is connected to the least-significant input bits of the priority register to be described (FIG. 11). The concatenation of the encoded output of the bank priority logic 60 in the least-significant bits of the priority register and the encoded output of the bit priority logic 68 in the most-significant bits of the priority register provides a number uniquely identifying a single location from among all locations.

The decoded output of the bit priority logic directly drives the input BI bus 22. The prioritize function is completed by loading the content of the input BI bus 22 into the capture flip-flops 40 of all associative memory logic banks 20(n) in parallel and simultaneously loading the bank capture flip-flops 56 with the decoded output of the bank priority logic 60 through the bank multiplexer 58. As described previously, only the location for whom both the capture flip-flop 40 and the bank capture flip 56 are in the zero state (activated state) is enabled.

The capture enable logic 72 generates the signal EE used for turning on and off the clock of the capture flip-flops 40 of the associative memory logic banks 20(n).

To recapitulate the operations of the present invention thus far described with respect to FIG. 5 and FIG. 8, the bus functions illustrated on FIG. 6 are as follows.

The input BI bus 22 is parallel connected to all the associative memory logic banks 20(n) The number of wires comprising the input BI bus 22 is equal to the number of associative memory locations within a single associative memory logic bank 20(n). The signals on the input BI bus are generated by the bit priority logic 68.

The EMIT signal is a single wire connected to all the associative memory logic banks 20(n). The EMIT signal is used to supply the bit being compared with a bit in a selected associative memory location bit position, to load the content of a selected associative memory location bit position, and to supply a bit from a number being added to the content of a selected associative memory location bit position. The EMIT signal is generated by the emit generation logic 84.

The EE signal is a single wire connected to all capture flip-flops 40. The EE signal is used to turn on and off the clock to the capture flip-flops. The EE signal is generated by the capture enable logic 72.

The AS signals are general enables connected to the RAMs 34 of their respective associative memory logic bank 20(n). There is an independent AS signal dedicated to each associative memory logic bank 20(n). The AS signals are used to enable or disable read and write access to the RAM 34. The AS signals are from the outputs of the bank capture flip-flops 56.

The AACG signal is a single wire independently generated by each associative memory logic bank 20(n). The AACG signals are used to determine when all the capture flip-flops 40 of a particular associative memory logic bank 20(n) are expected to be set by the next microinstruction cycle. The AACG signals are connected to the anticipated all capture pipeline register 70 and to the capture enable logic 72.

The output BO bus 32 signals are connected in parallel to the output bus buffers 48 of all the associative memory logic banks 20(n). The number of wires in the output BO bus 32 is the same as the number of wires in the input BI bus 22. The output BO bus 32 is also connected to the bit decoder output bus buffer 66. The output BO bus 32 signals are the input to the bit priority logic 68.

The output bus buffer enables BE are single wires connected to each respective associative memory logic bank 20(n). The BE signals are used to turn on or off the output bus buffers 48. The BE signals are generated by the decoded output of the bank priority logic 60.

The register logic portion of the present invention will now be described, with reference to FIG. 11. The register logic portion 74 encompasses the interface to the host processor 12, the priority register 76, the exchange register 78, the queue priority counter 80, the real-time counter 82, and the emit generation logic 84.

The exchange register 78 holds the data word received from the host processor 14 during its write operation. Depending on the function invoked, the contents of the exchange register 78 may then be transferred to the clock register 82 or be used in serial form by the associative memory logic portion 50 through the emit generation logic 84. The exchange register 78 also holds the data output to be sent to the host processor 14 during its read operation. Depending on the function invoked, the contents of the exchange register 78 may originate from the clock counter 82, the priority register 76, or the associative memory logic portion 50. In the latter case, the exchange register 78 operates as a shift register to collect the bits generated by the associative memory logic portion 50 in serial form.

The priority register is a register which maintains the priority encoded result of the last prioritization of the capture flip-flops 40 of the associative memory logic portion 50. Input to the most-significant and least-significant halves of the priority register 76 is generated by the bank priority logic 60 and the bit priority logic 68, respectively.

The queue priority counter 80 is an up-down counter used with the queue priority algorithm to be described. The contents of the queue priority counter 80 can be incremented, decremented, and initialized with the content of the exchange register 78.

The real-time counter 82 is used as a clock to maintain the current time for use by the executive functions. The contents of the real-time counter 82 can be incremented or initialized with the content of the exchange register 78. The real-time counter 82 is partitioned into most-significant and least-significant portions for greater time range. The loading and incrementing of the real-time counter 82 is under the control of the microsequence control logic portion (FIG. 9), to be described, to insure proper synchronization with the executive function algorithms.

The register selection multiplexer 86 is used to permit the contents of the exchange register 78, the queue priority counter 80, either portion of the real-time counter 82, the priority register 76, the host processor data bus, or the host processor address bus to be loaded back into the exchange register 78. The exchange register 78 is always clocked. The transfer of the contents of the exchange register 78 back into itself is the mechanism whereby its contents are not altered. The register selection multiplexer is forced to select the exchange register 78 when the queue priority counter 80 or either portion of the real-time counter 82 is being loaded.

The EMIT bit, the output of the EMIT generation logic 84, is used by the associative memory logic banks 20(n) as a common data input to the serial adder/subtractors 36 and as a common input to the memory data multiplexers 38. The EMIT generation logic 84 consists of a serial adder with output flip-flop 88 and two multiplexers 90 and 92 called bit selectors. One bit selector 90 is wired to select any of the exchange register 78 bits, any of the queue priority counter 80 bits, or zero as one of the inputs of the serial adder 88. The other bit selector 92 is wired to select any of the real-time counter 82 bits or zero as the other input to the serial adder 88. The bit selectors 90 and 92 are wired such that when both selectors are selecting a bit from a register or counter as opposed to zero, they select the bit in the same relative bit position. The purpose of the serial adder is to enable the generation of a series of EMIT bits representing the sum of the exchange register 78 and the real-time counter 82, which is required for converting relative time intervals provided by the host processor 14 into absolute time relative to the real-time counter 82. When this summation function is not required, one of the two data inputs of the serial adder 88 is fed a zero by the respective bit selector. The output of the serial adder flip-flop 88 is passed through buffer 94. The output of buffer 94 is the EMIT bit.

In addition to selecting from among the registers and counters described previously, multiplexer 86 can also be directed to select the current host processor address and write data. These are derived from the address and data busses of the host processor memory interface.

The method used to implement a Dispatch Check executive function using the hardware executive 10 shall now be described. The dispatch check executive function seeks to identify the task with the highest priority that is in either the ready or the running task state. When more than one task has been assigned the same user priority, the highest priority task is the task most recently placed in the ready task state, excluding the currently running task. Tasks of the same user priority are thus queued on a first-ready-first-dispatched basis.

The software in the host processor supplies the content of the user priority field of the task table entry by directly writing into the field of the hardware executive table location for the respective task. Successively higher priorities are specified by successively lower positive numeric values of the priority field. Since the sequence of task creations and terminations is arbitrary, and since the user priority assigned to each task is also arbitrary, the tasks stored in the task table are not in any particular sequence with respect to priority.

Queue priority information is stored in a separate priority field maintained by the hardware executive called the queue priority field. The content of the queue priority field is supplied by the queue priority counter 80 under microprogram control. Each time a task enters the ready task state, the content of the queue priority counter 80 is loaded into the queue priority field of the respective task and the queue priority counter 80 is incremented. The queue priority counter 80 is incremented by the microinstruction decode logic to be described. Since high priority is defined by low positive numeric value in the priority fields, the tasks entering the ready state first will automatically have lower values and hence higher priorities in their queue priority fields compared to those that follow. To prevent the queue priority counter 80 from overflowing, the queue priority counter 80 and the queue priority fields of all the tasks whose queue priority fields are greater than the queue priority of the task leaving the ready task state are decremented. The queue priority counter 80 is decremented by the microinstruction decode logic to be described. The qualifying queue priority fields are first located by a comparison with the queue priority counter which upon completion leaves only their capture flip-flops 40 containing zeros. These selected queue priority fields are then decremented using the loop from the RAM 34, through the serial adder/subtracter 36 where the contents are decremented, and on the next microinstruction cycle, through the data multiplexer 38, to finally return to the RAM 34.

A unified priority scheme encompassing both the user and the queue priority fields is constructed by concatenating the priority fields. Since the queue priority has an effect only when the user priority fails to resolve to a single task with the highest priority, the user priority is more significant than the queue priority. For this reason, the user priority occupies the most-significant bits and the queue priority the least-significant bits of the concatenated priority field. This same principle is used regardless of the complexity of the priority resolution defined for a particular implementation.

The microsequence control logic 98 of the present invention will now be described with reference to FIG. 9. Microsequence control logic 98 generates the control signals for the rest of the logic of the computer hardware executive of the present invention. It contains the clock oscillator 100, the host processor interface control logic 102, the microprogram memory 104, logic to decode fields of the microinstruction into various control signals, and logic to generate the next microinstruction address.

The logic that generates the next microinstruction address to be accessed from the microprogram memory 104 for each microinstruction cycle is called the transform logic 106. Usually the transform logic 106 obtains the bit constituting the next microinstruction address from a field in the microinstruction. In the preferred embodiment, there is no counter circuit acting as a microprogram counter. The transform logic 106 is used to convert the address presented by the host processor 14, which signifies the executive function or direct executive table access requested, into unique microinstruction addresses. Signals from the host processor 14 indicating whether the access is a read or a write are used by the transform logic 106 in conjunction with the host provided address to generate unique microinstruction addresses for each combination within the executive function address space of the hardware executive 10. A single microinstruction address is generated for direct reads and another for direct writes into the executive table address space of the hardware executive. The transform logic also provides conditional jumps on the state of the anticipated all capture signal, which is in the true state if and only if all the individual anticipated all capture gate 46 outputs of the associative memory logic banks 20(n) indicate that all the capture flip-flops 40 would be set if clocked on the previous microinstruction cycle.

The connection between the transform logic 106 and the microprogram memory 104 carries the microinstruction address. The connection between the microprogram memory 104 and the microinstruction register 108 carries the next microinstruction accessed from the microprogram memory 104. The microinstruction register 108 is used to synchronize the microinstruction read from the microprogram memory 104 with the microinstruction cycle clock of the hardware executive 10. It is noted that a portion the bits constituting the output of the microinstruction register 108 is fed back to the transform logic 106 so that the respective bits of the microinstruction can be used by the transform logic to specify the next microinstruction address as described previously.

The bits of the microinstruction register 108 output not fed back to the transform logic are used by the microinstruction decode logic which generates the various control signals used by the rest of the hardware, i.e., DS, ES, EG, DBE, IQC, etc.

The power reset circuit 112 is connected to the transform logic 106 and is used to force the microinstruction address generated by the transform logic 106 is an initial start-up address, regardless of any other inputs to the transform logic 106, when input electrical power is first applied to the hardware executive. In the preferred embodiment, the initialization signal to the transform logic 106 is also generated when a master reset signal is received from the host computer 10 through the host reset input buffer 111.

The clock oscillator 100 provides the clock signal used by all the registers, counters, and flip-flops of the hardware executive 10. Each cycle of the clock oscillator corresponds to a microinstruction cycle.

The tick timer 114 and the tick flip-flop 116 are used to initiate time event processing. The tick timer 114 is an oscillator operating at a preset frequency that is low compared to the frequency of the clock oscillator 100 used to cycle microinstructions. A frequency between 100 Hertz and 1 Hertz is typical. The actual frequency selected matches the resolution desired for time intervals implemented by the time event executive functions. The tick timer 114 is wired to the tick flip-flop 116 such that each tick pulse from the tick timer 114 sets the tick flip-flop 116 indicating to the microprogram that a tick has occurred that needs to be processed. The microprogram starts processing a tick after completing any executive function or direct access in progress. When the microprogram processes the tick, it clears the tick flip-flop 116 so that tick processing will not be repeated for the same tick.

The command register 118 is used to save the identity of the executive function received by the hardware executive 10 from the host processor 14 when the host processor referenced the hardware executive address space. Command register 118 is fed by command multiplexer 120. When the command is an executive function, the command multiplexer 120 feeds the concatenation of the least-significant bits of address from the host processor, the read-write bit, and a hard-wired non-zero pattern of bits indicating that the executive function address space is being accessed to the command register 118. When the command is for a direct executive table access, the command multiplexer 120 feeds the concatenation of the read-write bit and a unique non-zero pattern of bits indicating that the executive table address space is being accessed to the command register 118. When neither address space is being accessed, the command multiplexer 120 feeds all zero bits to the command register 118. Thus the command register contains a unique pattern of bits for every possible command from the host processor 14.

The address space detector 115 consists of a comparator whose output indicates when the address on the host processor address bus is within the range of the hardware executive address space. The output of the address space detector is gated with the host request signal to prevent the host request signal from being received by the host busy circuit 102 when the request is for an address not within the hardware executive 10 address space. The address space detector 115 is also wired to the command multiplexer 120 to force the output of the command multiplexer 120 to zero as described above.

The executive function space detector 117 consists of a comparator whose output indicates when the host processor address is within the range of addresses dedicated to hardware executive functions. In the preferred embodiment, this component reduces to a direct connection to one of the bits of the host processor address which in combination with the address space detector output indicates when the host processor address is within said range. The output of the executive function space detector 117 controls the selection of the command multiplexer 120.

The control and memory bus signals generated by the host processor 14 for use by the hardware executive 10 use input buffer circuits internal to the hardware executive to match the electrical loading requirements of the host processor. The input buffers are the host request input buffer 101 (FIG. 9), the host read/write input buffer 119 (FIG. 9), the host reset input buffer 111 (FIG. 9), the host memory address input buffers 127 (FIGS. 9 and 11), and the host memory write data input buffers 85 (FIG. 11).

The control and memory bus signals generated by the hardware executive 10 for use by the host processor 14 use output buffer circuits internal to the hardware executive to match the electrical drive requirements and driver type, i.e., open-collector or three-state, of the host processor 14. The output buffers are the data ready output buffer 103 (FIG. 9), the busy output buffer 105 (FIG. 9), the interrupt output buffer 107 (FIG. 9), and the host read date output buffer 96 (FIG. 11).

Figure 12:
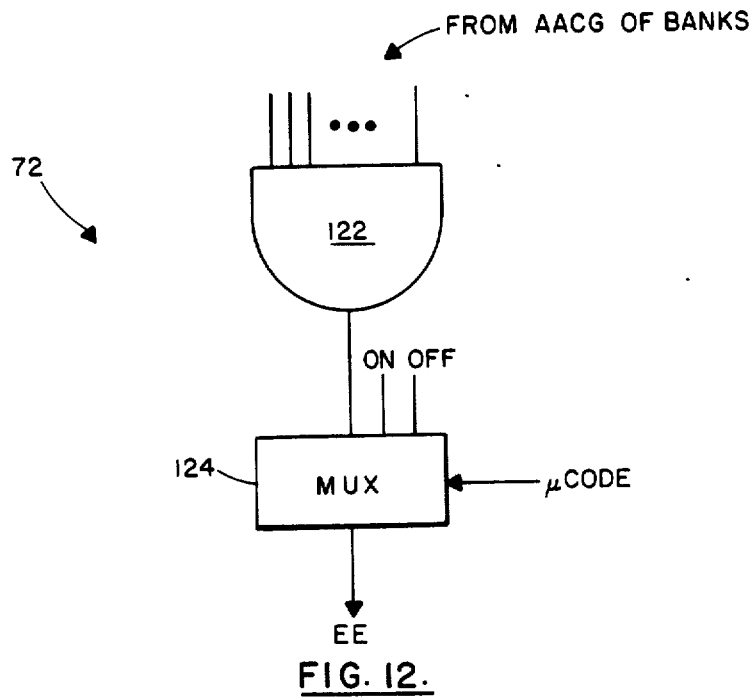
FIG. 12 is a block diagram conceptual representation of the capture enable logic portion of the present invention.

The capture enable logic 72 shall now be described. The capture enable logic circuit (FIG. 8) generates the signal EE which controls the clock to the capture flip-flops 40. The capture enable logic receives the output of the anticipated all capture gate 46 from each of the associative memory logic banks 20(n). As described previously, these gates indicate whether the capture flip-flops 40 would be set to one, or remain one, if they were clocked. The function of the capture enable logic is illustrated in FIG. 12. The capture enable logic 72 is functionally comprised of a gate 122 feeding a multiplexer 124. The gate 122 forms from the individual outputs of the anticipated all capture gates 46 a single signal indicating whether all capture flip-flops 40 in all associative memory logic banks 20(n) would be set, or remain set, if they were clocked. The multiplexer 124 is controlled by the microprogram. When the multiplexer 124 selects the output of the gate 122, the multiplexer output EE allows the capture flip-flops 40 to be clocked if and only if so doing would not leave all the capture flip-flops 40 set to one. The other two selections of the multiplexer 124 cause the capture flip-flops 40 to be clock or not clocked respectively, regardless of the present state of the capture flip-flops 40.

TABLE I

HARDWARE EXECUTIVE FUNCTIONS

| Executive Function | Type | Operand |
|---|---|---|
| INITIALIZE | Write | — |
| RESERVE TASK | Read | Task Index = Task ID |
| SUSPEND TASK | Write | Task Index = Task ID |
| RESUME TASK | Write | Task Index = Task ID |
| DISPATCH CHECK | Read | Task Index = Task ID |
| TERMINATE TASK | Write | Task Index = Task ID |
| RESERVE SEMAPHORE | Read | Semaphore Index |
| WAIT ON SEMAPHORE | Write | Semaphore ID |
| SIGNAL SEMAPHORE | Write | Semaphore ID |
| RELEASE SEMAPHORE | Read | Semaphore Index |
| RESERVE NORMAL EVENT | Read | Event Index |
| RESERVE TIME EVENT | Read | Event Index |
| CAUSE EVENT | Write | Event ID |
| NORMAL EVENT CHECK | Read | Event Index |
| TIME EVENT CHECK | Read | Event Index |
| CANCEL EVENT | Write | Event ID |

TABLE II

MICROINSTRUCTION FORMAT

Bit 31

Element Memory Write Control

0    Read

Reading is enabled for only those elements for whom both the Element Capture Flip-Flop and the Bank Capture Flip-Flop are not set. The Element Memory Output for disabled elements during a read operation is one.

1    10630-Write

Writing is enabled for only those elements for whom both the Element Capture Flip-Flop and the Bank Capture Flip-Flop are not set. The Element Memory Output of all elements during a write operation is one.

Bits 30 28

Capture Flip-Flop Function

The results of these functions appear at the Capture Flip-Flop outputs at the beginning of the next cycle. Unless otherwise noted, the Element Memory Address Register is loaded with the contents of Bit Position field.

0 0 0    No Change 0 0 1    Clear

All Bank and Element Capture Flip-Flops are cleared.
The Clear function is used to initialize the Capture Flip-Flops before a search operation.

0 1 0    Set

All Bank Capture Flip-Flops are set. The Element Capture Flip-Flops are unchanged.

0 1 1    Prioritize

All Bank Capture Flip-Flops are set except the flip-flop for the bank containing the Element Capture Flip-Flop that has the lowest element address and is not set. All Element Capture Flip-Flops of the selected bank are set except the flip-flop of the selected element. The Element Capture Flip-Flops in all banks are set identically. The Priority Register is loaded with the selected element address. It is cleared when no element is selected.
The Prioritize function normally follows a winnow function in order to select a unique element from all those elements not captured after a search operation.

1 0 0    Exclusive Winnow

If an Element Capture Flip-Flop is set, it remains set. Otherwise it is set if the output of the respective serial arithmetic unit is one and so doing does not leave all Element Capture Flip-Flops set. The Bank Capture Flip-Flops are cleared.
The Exclusive Winnow function is used when searching for a field with the lowest numeric value. Since at least one

TABLE II-continued
MICROINSTRUCTION FORMAT field satisfies the search, the function inhibits the setting of any Element Capture Flip-Flops if so doing will leave all of them set.

1 0 1     Inclusive Winnow

If an Element Capture Flip-Flop is set, it remains set. Otherwise it is set if the output of the respective serial arithmetic unit is one. The Bank Capture Flip-Flops are cleared. The Inclusive Winnow function is used when searching for a field whose contents are identical to some key. Since possibly no field satisfies the search, the function permits all the Capture Flip-Flops to be simultaneously set.

1 1 0     Exchange Register Addressed

All Bank Capture Flip-Flops are set except the flip-flop for the bank selected by bits 5 through 3 of the Exchange Register. All Element Capture Flip-Flops in each bank are set except the flip-flop selected by bits 2 through 0 of the Exchange Register. The Element Capture Flip-Flop in all banks are set identically.
The Exchange Register Addressed function permits the specification of the element address by the host processor Write Data as required for the Suspend and Resume state change executive functions. It also permits the selection of the appropriate element during a direct read or write access by the host processor.

1 1 1     Exchange Register Addressed

Same as above.

Bits 27 - 24
Register Function 0 0 0 0 Clear Exchange Register
0 0 0 1 Increment Time Counter
0 0 1 0 Increment Queue Priority Counter
0 0 1 1 Decrement Queue Priority Counter
0 1 0 0 Load Upper Time Counter from Exchange Register
0 1 0 1 Load Lower Time Counter from Exchange Register
0 1 1 0 Load Queue Priority Counter from Exchange Register
0 1 1 1 Store Host Processor Address into Address Register
Address Register bits 3 through 0 are always taken from Microinstruction bits 11 through 8. Address Register bits 7 through 4, which are normally Microinstruction bits 15 through 12, are replaced by this function with Host Address bits 3 through 0.
1 0 0 0 No Change
1 0 0 1 Shift All Capture Flag into Exchange Register
Each bit of the Exchange Register is shifted one place right. The most-significant bit is lost. The All Capture Flag is shifted into the least significant bit.
The Shift Exchange Register function collects the bits read from successive bit positions of an element for return to the host processor during a direct read access.
1 0 1 0 Store Queue Priority into Exchange Register
1 0 1 1 Store Upper Time Counter into Exchange Register
1 1 0 0 Store Lower Time Counter into Exchange Register
1 1 0 1 Store Priority Register into Exchange Register
1 1 1 0 Store Host Processor Data into Exchange Register
1 1 1 1 Store Host Processor Address into Exchange Register Bits 23 - 22

Serial Arithmetic Function

Initialization of the Output and Carry flip-flops of the serial arithmetic unit occurs immediately. The results of the Add and Subtract functions are not available until the beginning of the next cycle.

0 0     Clear Output, Clear Carry, Connect Output to Element Memory Data Input.
0 1     Clear Output, Set Carry, Connect Emit Bit to Element Memory Data Input
1 0     Add, Connect Output to Element Memory Data Input
1 1     Subtract, Connect Emit Bit to Element Memory Data Input Bits 21-19

Binary Operand Select

If Bit 23 is zero, the output is cleared regardless of the contents of Bits 21 through 19. The results of these functions are not available at the data inputs of the element memory and the serial arithmetic unit until the beginning of the next cycle.

0 0 0     Zero
0 0 1     Two
0 1 0     Queue Priority

The 16 Queue Priority Counter bit positions are addressed by the least-significant bits of the Bit Position field.
The Queue Priority Counter supplies the contents of the task element queue priority fields when tasks are moved to the ready or running task state. It is used to implement queuing within user supplied priority levels.

0 1 1     One
1 0 0     Time Plus Exchange Register

The bit positions of the Time Counter and the Exchange Register are addressed by the least-significant bits of the Bit Position field. They must be addressed sequentially from least to most significant for the proper sum to by computed serially.
This function is used to add a time interval suppled by the user through the Exchange Register to the current time maintained in the Time Counter to form the trigger time for time events.

1 0 1     Time

The 32 Time Counter bit positions are addressed by the least-significant bits of the Bit Position field.
The Time Counter provides a time base for time-dependent and time-critical events. The output of the Time Counter is compared with the contents of the trigger time registered with timed events to determine if the event should be triggered.

1 1 0     Exchange Register

The 16 Exchange Register bit positions are addressed by the least-significant bits of the Bit Position field.

1 1 1     Zero

Reserved for the future.

Bits 18-16

Branch and Host Interface Control 0 0 0     Clear Host Interface Busy

Bit 0 of the next microinstruction address is zero. Host Interface Busy is cleared.

0 0 1     Pulse Host Interface Data Available

Bit 0 of the next microinstruction address is zero. Host Interface Data Available is strobed.

0 1 0     Clear Tick Flag

Bit 0 of the next microinstruction address is zero. The Tick Flag is Cleared.
The Tick Flag is set by the tick interval counter. It is cleared by the microprogram after completing the triggering of timed events.

0 1 1     Pulse Host External Interrupt

The External Interrupt line is pulsed. The External Interrupt line is pulsed by the microprogram when a time-critical event is identified.

1 0 0     Zero

Bit 0 of the next microinstruction address is zero.

1 0 1     One

Bit 0 of the next microinstruction address is

| | TABLE II-continued |
|---|---|
| | MICROINSTRUCTION FORMAT |
| | one. |
| 1 1 0 | All Capture Flag |
| | Bit 0 of the next microinstruction address is zero if all the Element Capture Flip-Flops are set. Otherwise it is one. |
| 1 1 1 | Transform |
| | Bit 0 of the next microinstruction address is one. Bits 8 through 1 of the next microinstruction address are the logical bitwise OR of the command transformed from the host processor memory address lines and bits 7 through 0 of the microinstruction. |
| Bits 15–8 | |
| | Bit Position |
| | The Bit Position field specifies the element bit position within the element memory by loading the Element Memory Address Register. Exceptions are noted in the description of the Register Function field. It also specifies the register bit position when the Binary Operand Select field selects a register. The specified bit position address is available to the element memory and selected register at the beginning of the next cycle. |
| Bits 7–0 | |
| | Next Microinstruction Address |
| | The Next Microinstruction Address field specifies bits 8 through 1 of the next microinstruction address. Bit 0 of the next microinstruction address is generated by the Branch and Bus Control field. |

It is understood that the bit assignments illustrated in Table II above are by way of example only and could be assigned otherwise depending upon the particular design requirements. It is also noted that there are thirty-two bits in the microinstruction in the preferred embodiment of the present invention but it is to be understood that other numbers of bits may be utilized if desired.

Bit 31, for example, is a bit of the microinstruction register 108 which is hooked up to the WE input of all the RAMs 34. The WE inputs of each RAM 34 instructs the RAM whether it is to perform a read or write function.

The next field of the microinstruction, bits 30 through 28, control what the capture flip-flops are doing and these bits are directed to the capture enable logic 72 and the bit selection logic 54. If this field has 000 in it, the capture flip-flops 56 do nothing. The EE line is forced into a state such that the capture flip-flops 56 do not change state. If there is a 001, the capture flip-flops are cleared. 010 is a set function. 011 is the prioritize function. When a dispatch check executive function is performed, a single location address must be returned to the host processor. This function is used to examine all the capture flip-flops 40 which contain "zeros", to ignore all the capture flip-flops 40 which contain "ones" and to select from the ones containing "zero" a unique location. Tracing this prioritize function through the hardware executive 10 goes as follows. In order to prioritize across all locations, it first must be determined which bank $20_n$ has the priority being looked for and then the location (or element) within the bank $20_n$ is searched for the priority of interest. First, the output of the capture flip-flops 40 is routed through to the bank priority logic via the pipeline register 70. The bank priority logic 60 generates the bus enable BE for the bank $20_n$ selected. The bus enable BE is routed to the enable input of the particular bus buffer 48 to turn on the buffer 48 of the selected bank $20_n$. That permits the content of the capture flip-flop 40 within that bank to come through the buffer 48 through the output BO bus 32 and into the bit priority logic 68 to select the location within the a.m.l. bank $20_n$ having the priority of interest. The outputs of the bit and bank priority logic, 68 and 60, respectively, are fed into the priority register 76. The bank and bit priority logic 60 and 68, respectively, also generate a decoded output which is sent, in the case of the bit priority logic 68 over the BI bus 22 and is eventually multiplexed into the capture flip-flops 40 by a multiplexer 42.

Thus the prioritize function places in the priority register 76 the selected location in the associative memory bank $20_n$ and changes the contents of the capture flip-flop 40 so that all the capture flip-flops 40 will contain "ones" except for the locations in the selected bank which will contain a "zero". It is noted that the BI bus 22 is wired in parallel to each of the banks so the result of the bit priority logic 68 will be fed to the capture flip-flop 40 of each of the banks $20_n$. Thus, if location 2, for instance, of the selected bank $20_n$ was the selected location, then the capture flip-flops 40 in each of the banks $20_n$ associated with a number two location would appear to be selected. The function of excluding the selected locations from the nonselected banks $20_n$ is accomplished by the bank capture flip-flops 56. It is recalled that a RAM 34 is enabled only if its capture flip-flop 40 and its bank capture flip-flop 56 both indicate that the RAM 34 should be enabled. The bank capture flip-flops 56 are under control of the bank priority logic 60 and thereby will disable the non-selected banks $20_n$.

A numerical value of 100 in bit positions 30 through 28 cause implementation of the exclusive winnow function which is utilized to perform a sort. A numerical value of 101 in bit positions 30 through 28 causes implementation of an inclusive winnow function which is utilized to perform a search function. Numerical value of 110 is the exchange register address function. Numerical value of 111 in bit positions 30 through 28 is the host processor address function.

Figure 1:
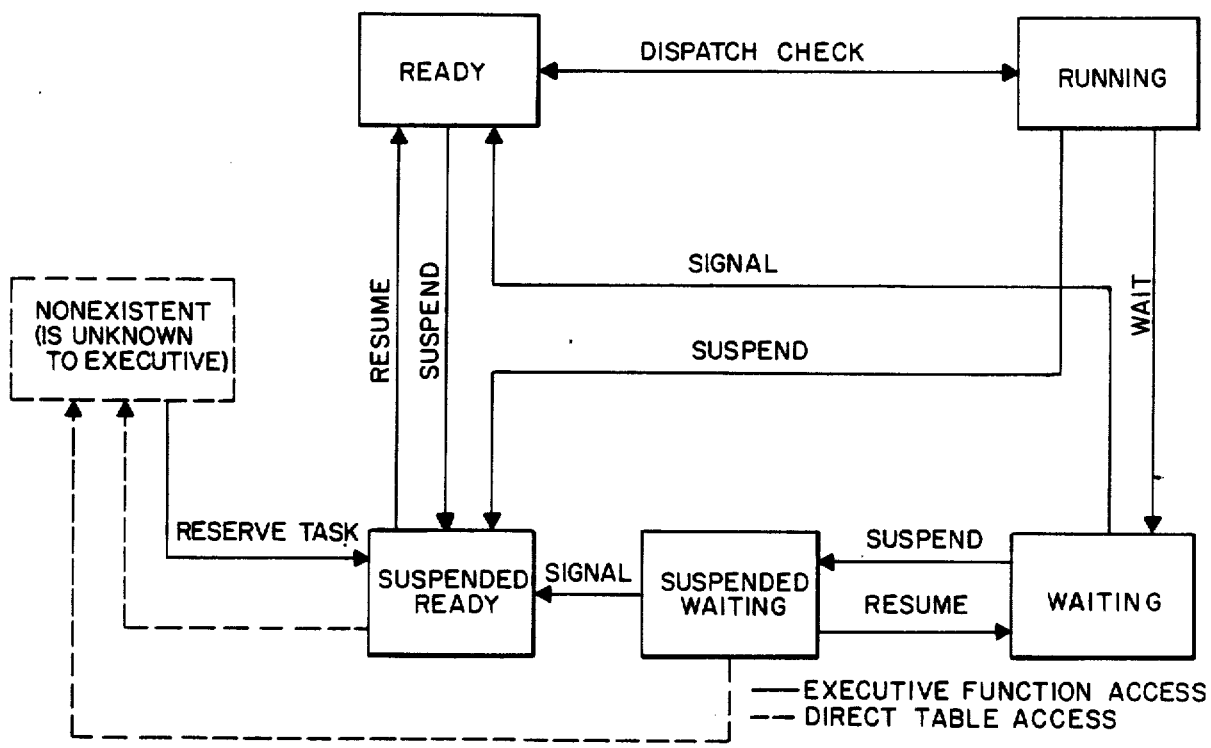
FIG. 1 is a task state transition diagram previously referred to in the Summary of Invention.
Figure 2:
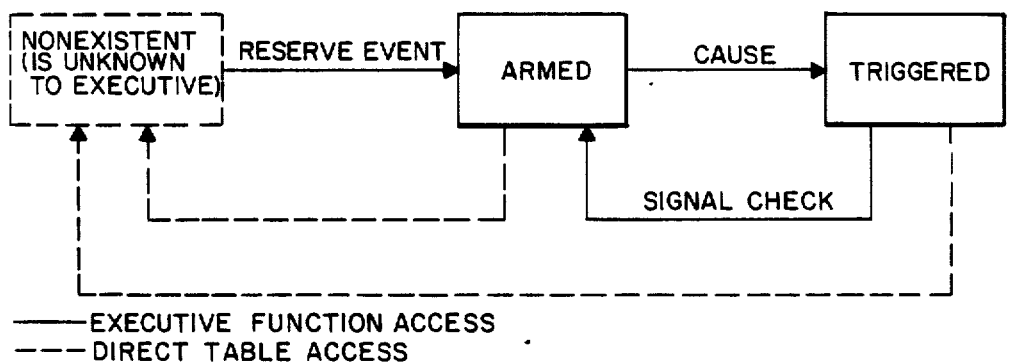
FIG. 2 is an event state transition diagram previously referred to in the Summary of Invention.
Figure 3:
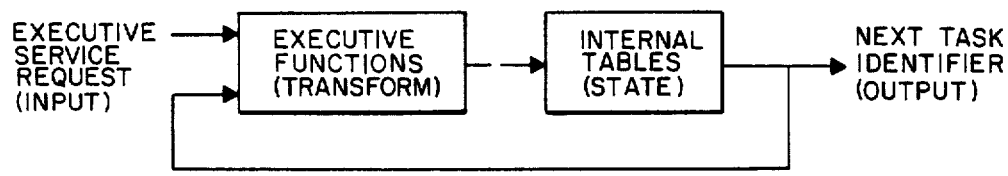
FIG. 3 is a block diagram of the computer executive implementation modeled as a state machine previously described in the Summary of Invention.

There are two kinds of numbers which can be entered into the hardware executive 10, those numbers identifying addresses and those which constitute data. When an address is entered into the hardware executive 10 to perform one of the functions illustrated by the dotted lines of FIG. 1, the address supplied by the host processor 12 is converted into an enable signal to the appropriate associative memory $20_n$ location. This is most easily accomplished by setting or enabling its capture flip-flop 40.

Figure 13:
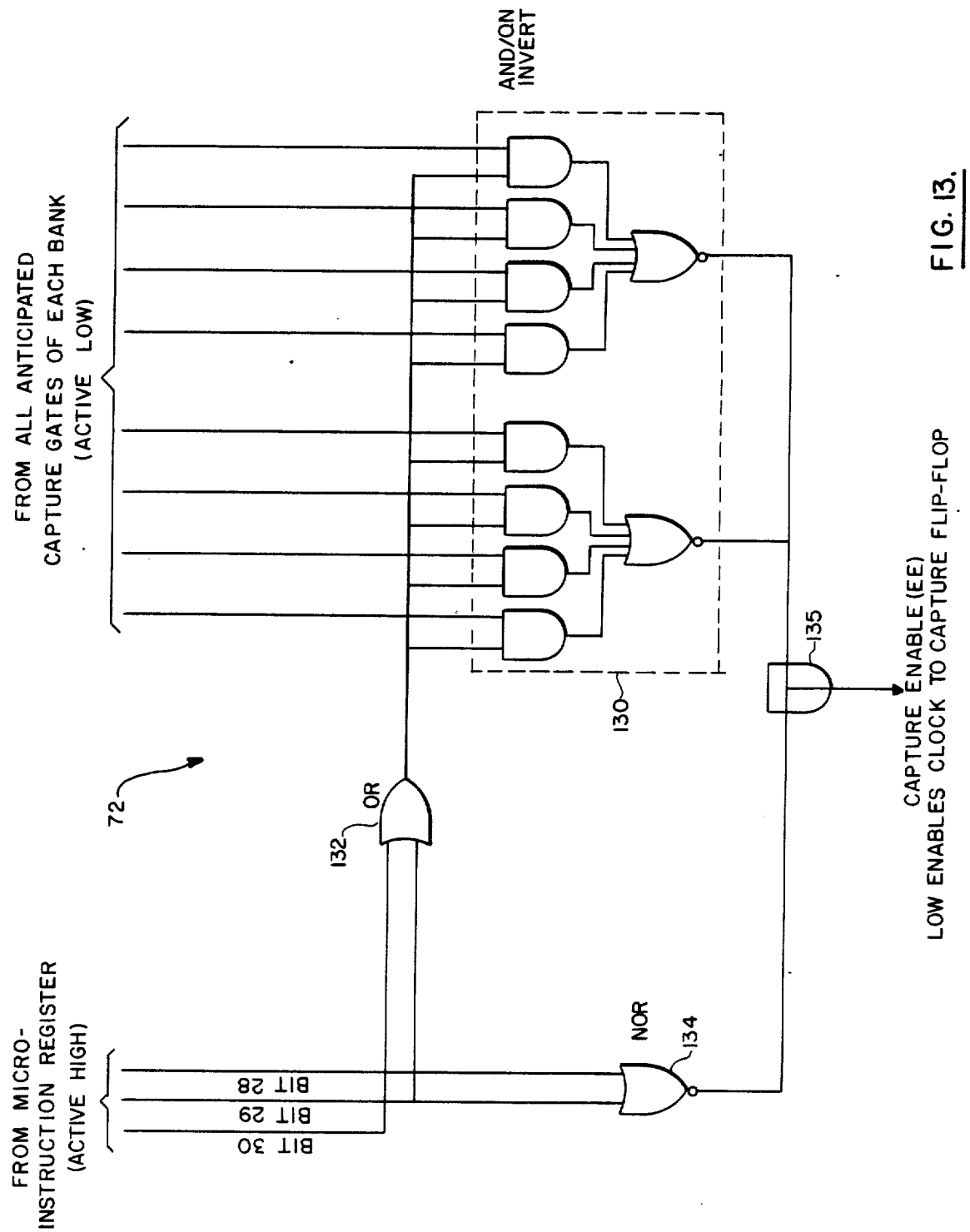
FIG. 13 is a block diagram of the capture enable logic of the present invention.

The capture enable logic 72 may be implemented as follows with reference to FIG. 13. The capture enable logic 72 may be envisioned as an AND gate 122 feeding a multiplexer 124 as is illustrated in FIG. 12. The multiplexer 124 function is implemented as illustrated in FIG. 13 which shows the control lines of the multiplexer. There are eight inputs coming in from the AACG lines derived from the outputs of the AND gates 46 of each associative memory 20$_n$ which feed the AND/OR invert gates 130. Bits 28 through 30 of the microinstruction register 108 are fed to the OR gate 132 and to the NOR gate 134 as is illustrated. These bits form the control lines of the multiplexer 124.

Each of the control signals furnished as inputs to the components of each associative memory logic bank 20$_n$ illustrated in FIG. 5 will now be described as to what they do and how they interconnect with the remainder of the system. The write enable signal WE is connected to the microinstruction register 108 bit 31. This is the signal that constitutes the write enable for each of the RAMs 34. The SADSU and the SACLR signals control the serial adder/subtracters 36 and are connected to microinstruction register 108 bits 22 and 23, respectively. Signal SADSU tells the adder/subtracters 36 whether to add or subtract. Signal SACLR is used to initialize the serial adder/subtracters 36. Signal DS is the select input of the data multiplexer 38 and also is connected to microinstruction register 108 bit 22. The serial adder/subtracter 36 performs addition when the data multiplexer 38 selects the output of the serial adder/subtracter 36 and performs subtraction when the data multiplexer 38 selects the EMIT bit. The EMIT is a single bit which is wired to the input of the data multiplexer 38 and the serial adder/subtracter 36 for each associative memory location. Signal ES is the capture flip-flop multiplexer select signal and is wired to multiplexer 42 such that the multiplexer 42 selects from the BI bus 22 when microinstruction register 108 bit 29 is a "one". The capture flip-flop multiplexer 42 gate is wired such that the output of the multiplexer 42 is "zero" regardless of the input when microinstruction 108 bits 30 and 29 are both "zero". Bits 30 and 29 are thus ANDed and the AND gate output is sent to the multiplexer 42 as signal EG. The signal EE is the capture flip-flop 40 clock enable and forces new contents to be caught into the capture flip-flops 40 when both microinstruction register 108 bits 29 and 28 are not "zero". Otherwise, new contents are clocked into the capture flip-flops 40 only when neither microinstruction register 108 bits 30 nor 29 are "zero" and none of the All Anticipated Capture Gates (AACG's) outputs from the associative memory banks 20$_n$ indicate that all their capture flip-flops 40 would otherwise be set if the clock occurred. BE is the associative memory bank output bus buffer 48 enable and connects the content of the capture flip-flops 40 of an associative memory bank 20$_n$ to the output BO bus 32 when the signal BDE has not connected the bit decoder bus buffer 66 and the bank priority logic 60 has selected this bank. No more than one buffer can be connected to the output bus BO 32 at any given time. There is one BE input wire for each associative memory bank 20$_n$. Finally, the signal BDE is the bit decoder bus buffer 66 enable and this connects the output of the bit decoder 64 from the output bus BO 32 and the input of the bit priority logic 60 when microinstruction register 108 bit 28 is "one" and microinstruction register 108 bit 30 is "zero".

The address for a bit position location within an associative memory bank 20$_n$ comes from two places, one place being from the microinstruction register 108 so the microcode can specify which bit position will be acted upon. However, when directly writing into the memory from the host processor 12 or when directly reading from the memory, the host processor 12 puts bits on its address bus specifying where in the memory the host processor 12 is looking; a portion of those bits are run directly into the A input of the RAM 34 when that function is implemented. This is accomplished by the multiplexer 128 and the address register 126 illustrated in detail in FIG. 14 and to be described more specifically below. By this connection of components, the bits which indicate which host processor "word" is involved come from the host processor memory address bus rather than from the microinstruction register 108. The same microcode may thus be used to load a word which the host processor is accessing regardless of where the word is located.

Figure 9:
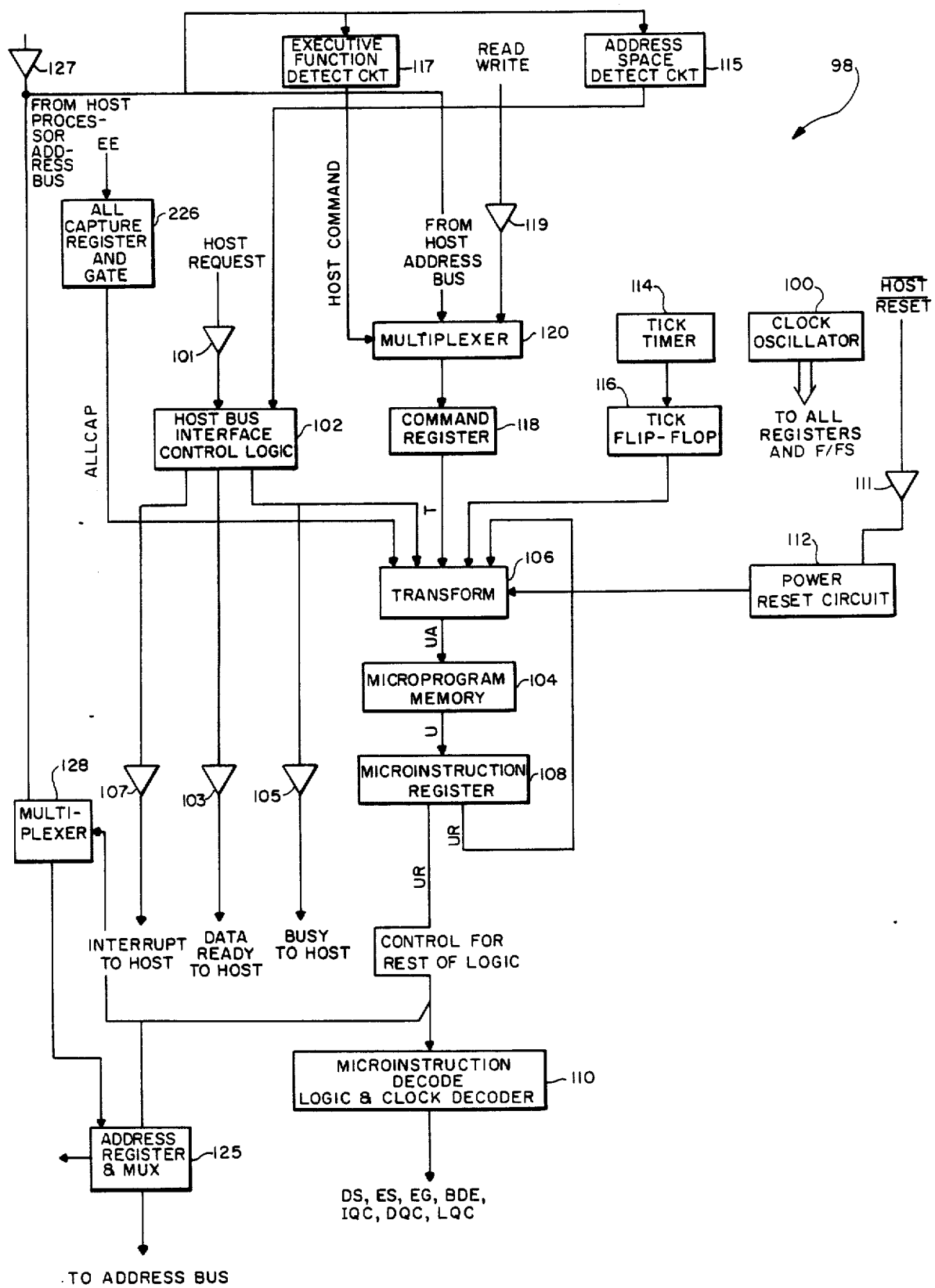
FIG. 9 is a block diagram of the microsequence control logic portion of the present invention.
Figure 15:
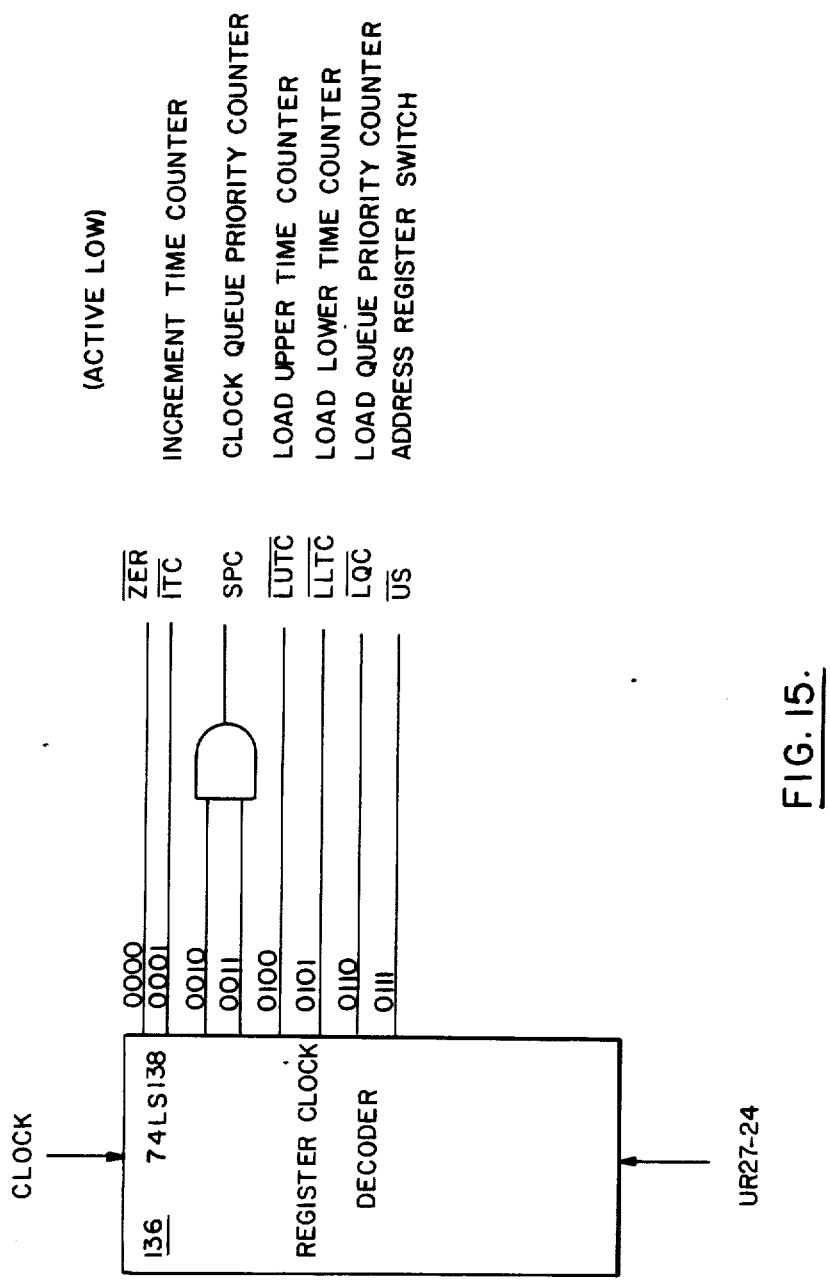
FIG. 15 is a block diagram of the register clock decoder portion of the microinstruction decode logic portion of the present invention.

Referring now to FIGS. 9, 11 and 15, the register clock decoder 136 will be described. There are a number of signals which are used as clock pulses and are derived from clock oscillator 100 illustrated in FIG. 10 and which are channeled through the register clock decoder 136. The register clock decoder 136 sends these control pulses to various other components of the hardware executive 10. This decoder, shown in detail in FIG. 15, is part of the microinstruction decode logic 110 and may be implemented with a model 74LS138. Its select inputs are wired to bits 27 through 24 from the microinstruction register 108. Thus, for example, if bits 27 to 24 have 0001 in them, the register clock decoder 136 will send a pulse, ITC, to the real time counter 82 to increment the time counter. The other signals ZER, SPC, LUTC, LLTC, LQC and US are the signals which clear the exchange register, which clock the queue priority counter 80 which load the upper time counter of the real time counter 82, which load the lower time counter of the real time counter 82, which load the queue priority counter 80 and which switch the address register 126 via multiplexer 128, respectively.

The bit priority logic 68 and the bank priority logic 60 will now be described in detail with reference to FIG. 10. Both the bit priority logic network 68 and the bank priority logic network 60 are identical and in the present embodiment are comprised of eight NAND gates 140, 142, 144, 146, 148, 150, 152, and 154 in the decoded section and three NAND gates 156, 158, and 160 in the encoded section. The input to this priority circuit is "high" if it is desired that it be prioritized. The input is "low" if no action is to be taken. There are two general outputs, the decoded priority output 162 which is "active low" and the encoded priority output 164 which is "active high". The decoded output 162 selects a single signal from the eight signals coming in to the NAND gates 140 through 154, inclusive. The one selected output will be different from the other seven. Since the decoded output of the priority circuit is active "low", the selected output will be "low" and the others will be "high".

The encoded priority output 164 takes the output that has been selected by the decoded output 162 and generates a number specifying the output that was selected.

The highest priority input is the one on the right. If a high comes in on this NAND gate 154, for instance, there will be a low on the output of NAND gate 154. This low also connects to every other NAND gate of lesser priority, i.e. gates 140 through 152, inclusive. This low prevents all the other NAND gates of the priority circuit from turning on even if they have a high input. Thus, the highest priority signal will cause its NAND gate to have an active "low" output and will prevent all other NAND gates from having active "low" outputs.

The NAND gates 156, 158 and 160 will produce a "one" if any of their inputs goes "low". At most, only one of these inputs can go "low". The inputs to the encoded section 162 NAND gates 156, 158 and 160 are so wired that they select the bit positions from the decoded output to generate their number.

Figure 17:
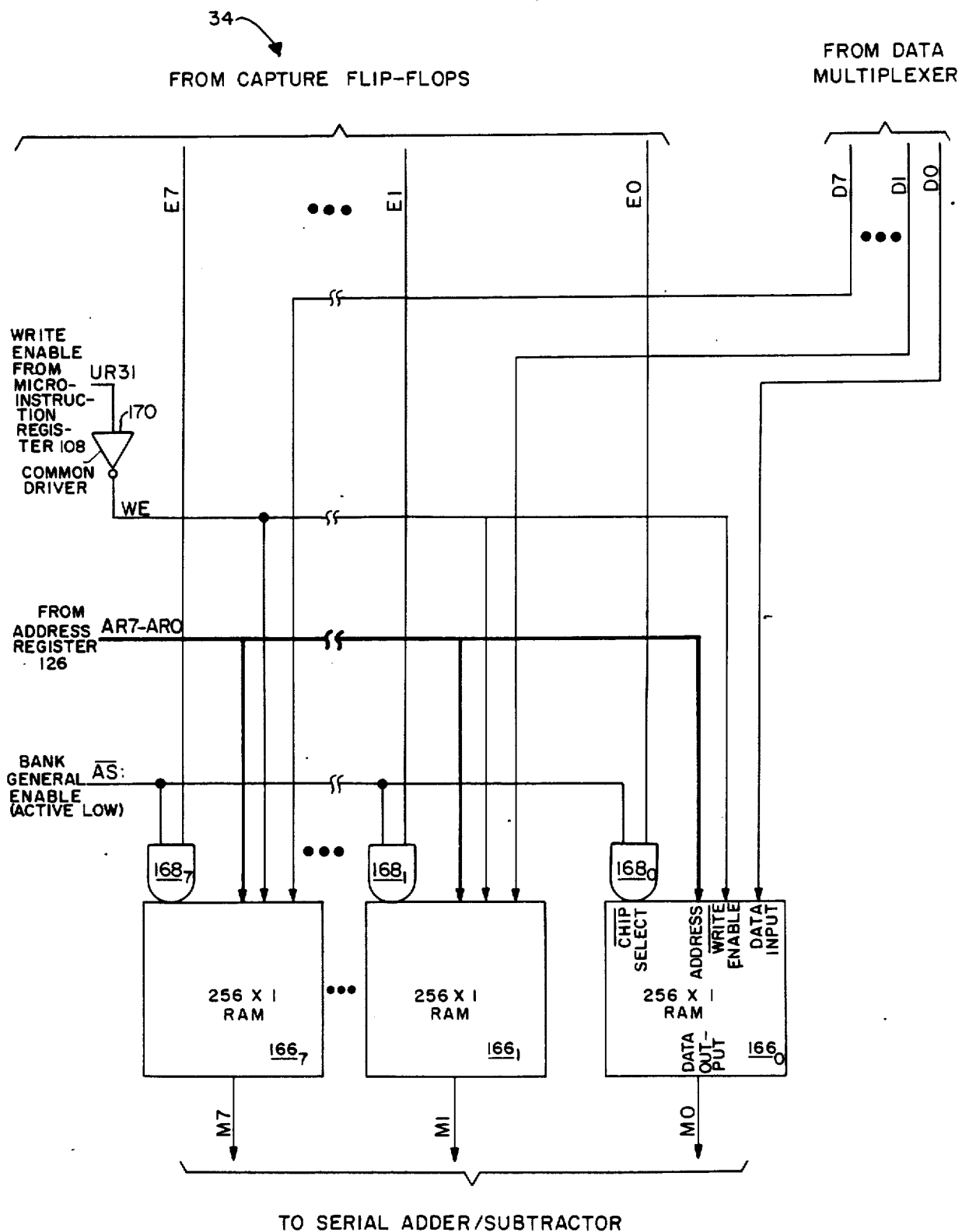
FIG. 17 is a network block diagram of one of the random access memories of the present invention.

The random access memory 34 illustrated in block diagram in FIG. 5 will now be described in detail with reference to FIG. 17. Each RAM 34 is implemented as follows. It is noted at this point that in the preferred embodiment of the present invention, each RAM 34 comprises eight 256-word by one-bit RAM components $166_0$, $166_1$, ..., $166_7$. Each component RAM ($256 \times 1$) 166 represents a memory location (element).

The $\overline{AS}$ signal is the general bank enable signal, there being one such signal for each memory bank $20_n$. This signal $\overline{AS}$ is fed through an AND gate at the input to each memory location RAM 166. These eight memory location RAMs are commercially available with he input AND gates $168_0$, $168_1$, ... $168_7$. All the write enable lines $\overline{WE}$ are wired in parallel. All address lines from the address register 126 are wired in parallel. The $\overline{AS}$ signal is wired in parallel for all the $256 \times 1$ RAMs 166 within each bank $20_n$. The $\overline{AS}$ signal for each bank $20_n$ are separate from each other. It can be seen in FIG. 17 that the write enable signal $\overline{WE}$ is generated from bit 31 of the microinstruction register 108. The common driver inverter 70 is used to generate a sufficient drive signal so as to power all the $256 \times 1$ RAM chips 166.

Figure 14:
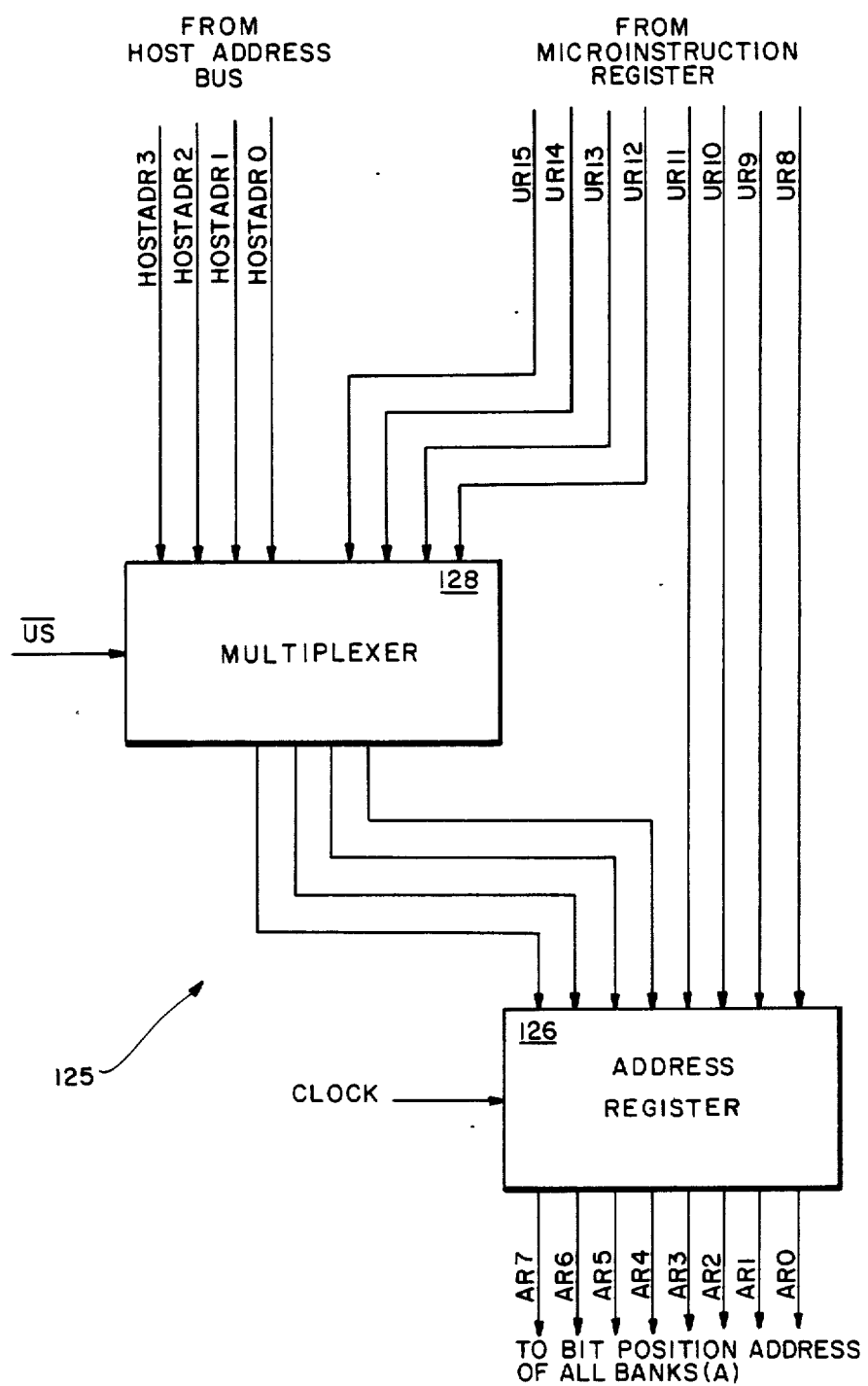
FIG. 14 is a block diagram of the memory address register logic portion of the present invention.

Referring now to FIG. 14 the address register logic comprised of address register 126 and multiplexer 128 will be described in detail. The address register logic generates the address inputs to all the RAMs in each associative memory bank $20_n$. The purpose of this network is to allow the least significant bit of the host bus address to be switched into the associative memories $20_n$ so that a particular segment representing a host processor "word" can be read or written from the associative memories. Normally, the multiplexer 128 would connect the address inputs of the RAMs 34 directly to the microinstruction register 108 but this multiplexer 128 can be operated so as to allow the host address to come through directly.

Figure 18A:
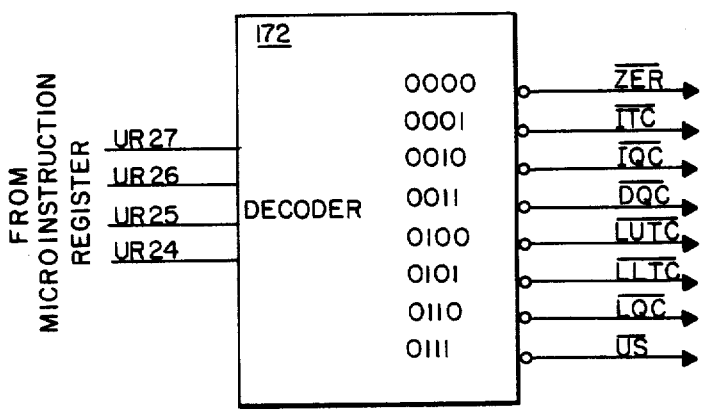
FIG. 18a is a block diagram of another portion of the microinstruction decode logic of the present invention.

The interconnection of the individual bits from the host address bus and from the microinstruction register 108, i.e. bits 0 through 3 and bits UR8 through UR15, respectively are shown connected as illustrated in FIG. 14 to multiplexer 128 and the address register 126. Also, the individual output bits of the address register 126 and the clock input to register 126 are illustrated in FIG. 14. The signal $\overline{US}$ is generated by decoder 172 which is illustrated in detail in FIG. 18a and is part of the microinstruction decode logic 110. The signal $\overline{US}$ is generated when the input to the decoder 172 is 0111, in the present example, this input being derived from bits 27 through 24 of the microinstruction register 108.

It is also noted at this point that the signal $\overline{ZER}$ from the decoder 172 output is used to clear the exchange register 78. Once the exchange register 78 is clear, the output of the exchange register 78 is used via the multiplexer 86 to clear the queue priority counter 80, the clock counter 82 and the other registers.

Figure 18B:
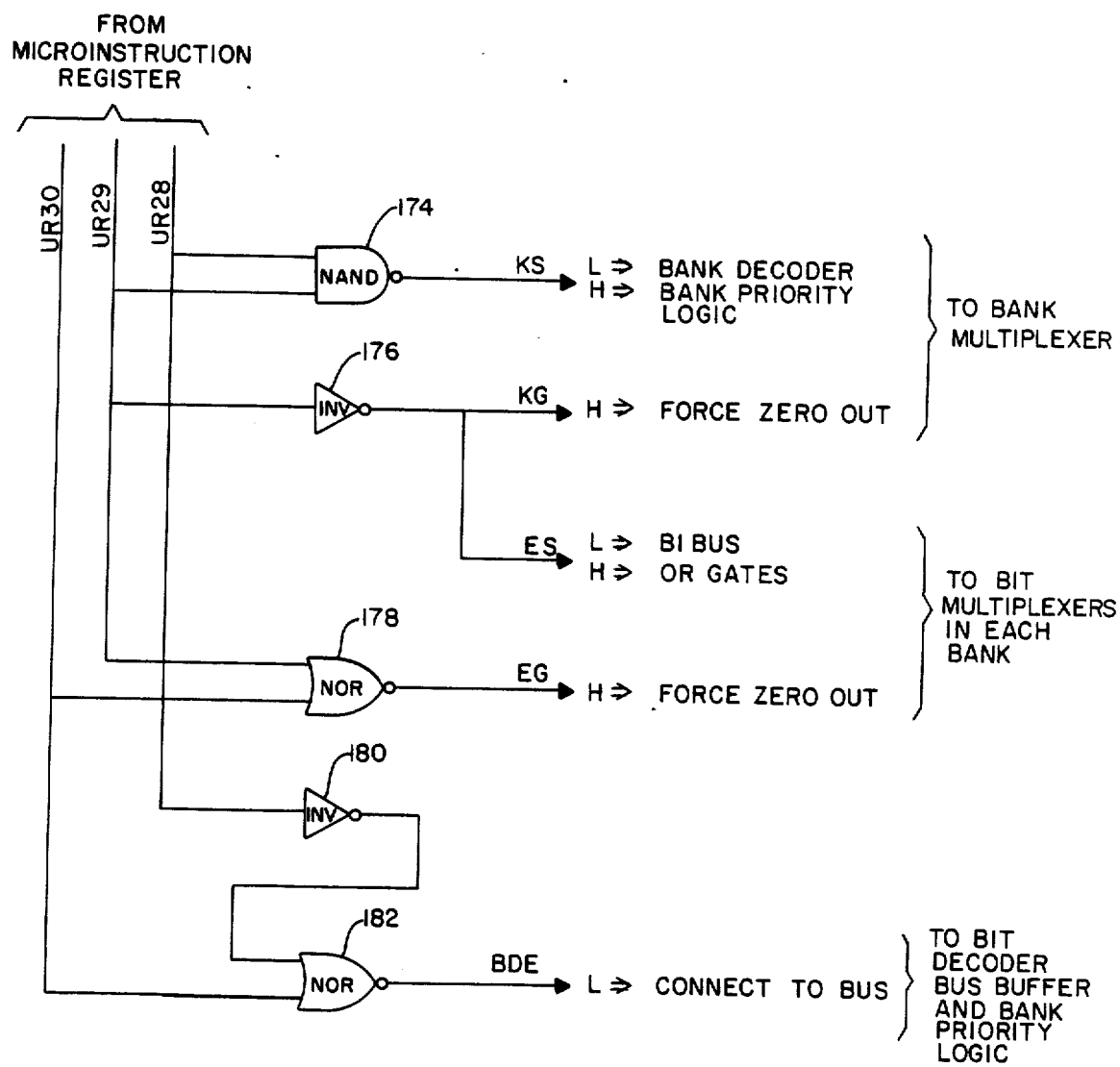
FIG. 18b is a block diagram of a still further portion of the microinstruction decode logic of the present invention.

Referring now to FIG. 18b there are illustrated the various gates utilized to control the multiplexers 58 utilized in the memory selection logic section 50, generating, for instance, the KS and the KG signals which control the bank multiplexer 58. FIG. 18b illustrates what the "high" and "low" outputs, H and L, respectively, switch. The portion of the microinstruction decode logic 110 illustrated in FIG. 18b is comprised of NAND gate 174, inverter 176, NOR gate 178, inverter 180, and NOR gate 182 connected to bits UR 30 through UR 28 from the microinstruction register 108. These gates 174 through 182 generate the signals KS, KG, ES, EG and $\overline{BDE}$, respectively.

Referring again to FIG. 18a, it can be seen how the signals $\overline{ZER}$, $\overline{ITC}$, $\overline{IQC}$, $\overline{DQC}$, $\overline{LUTC}$, $\overline{LLTC}$, $\overline{LQC}$, and $\overline{US}$ are generated. It is understood that the overbar denotes active "low" signals. The signal $\overline{ZER}$ is utilized to clear the exchange register 78. The signal $\overline{ITC}$ is utilized to increment the time counter 82. The signal $\overline{IQC}$ is utilized to increment the queue counter 80. The signal $\overline{DQC}$ is utilized to decrement the queue counter 80. The signal $\overline{LUTC}$ is utilized to load the upper time counter portion of the time counter 82 and the signal $\overline{LLTC}$ is utilized to load the lower time counter portion of counter 82. $\overline{LQC}$ is the signal that is utilized to load the queue counter 80 and finally, as previously described $\overline{US}$ is the address register 126 control signal utilized as a control input to multiplexer 128.

Figure 19:
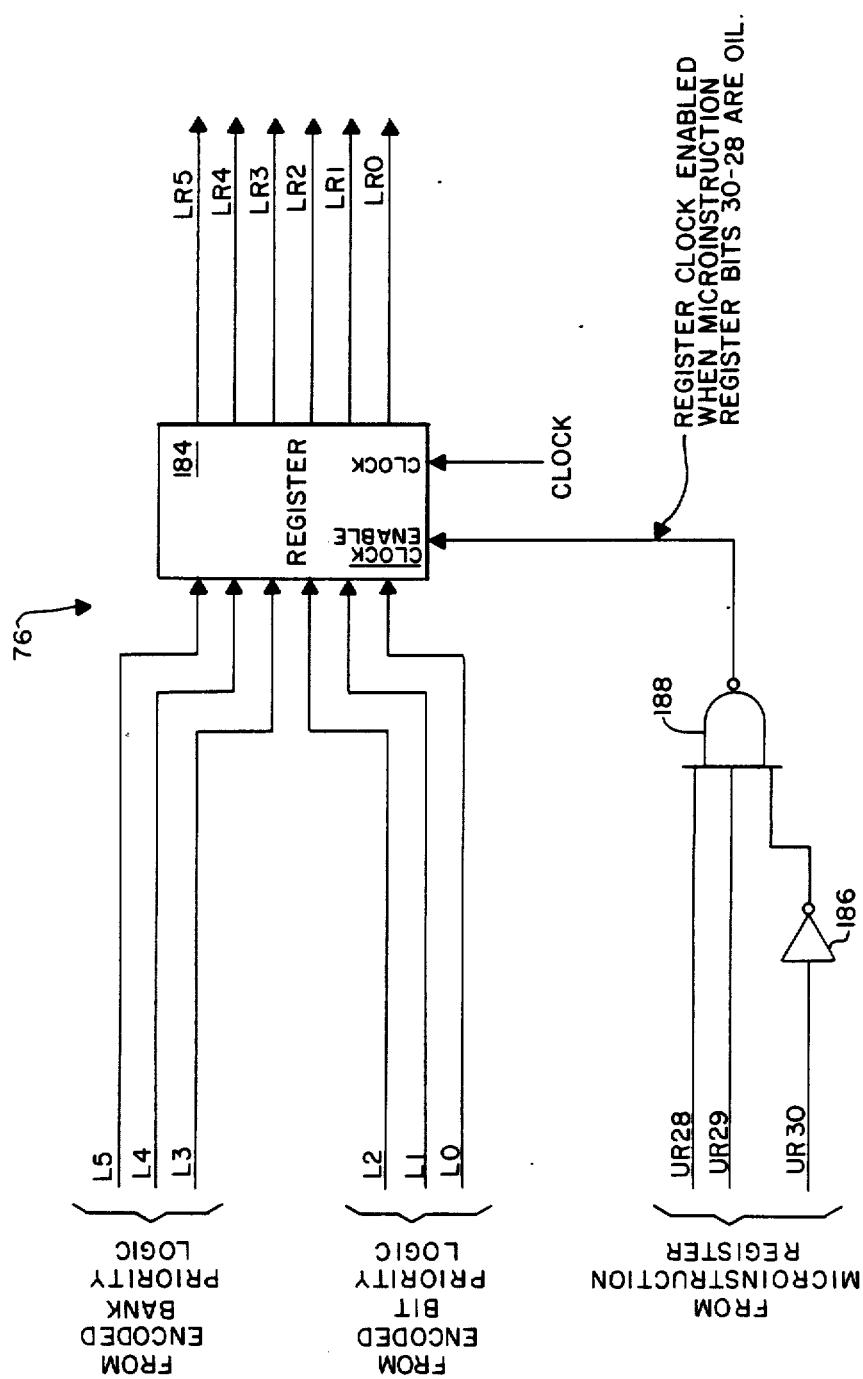
FIG. 19 is a block diagram of the priority register of the present invention.

Referring to FIG. 19 the priority register 76 illustrated in block diagram form in FIG. 11 is seen in detail along with its associated logic gates. The priority register 76 is comprised of register 184, the inputs to which are the least and most significant outputs from the bit and bank priority logic 68 and 60, respectively. Register 184 is controlled by microinstruction register bits UR 20 through UR 30 via inverter 186 and NAND gate 188. The register 184 will only record the value coming into its input when 011 is in the field of bits UR 28 through UR 30.

Figure 20:
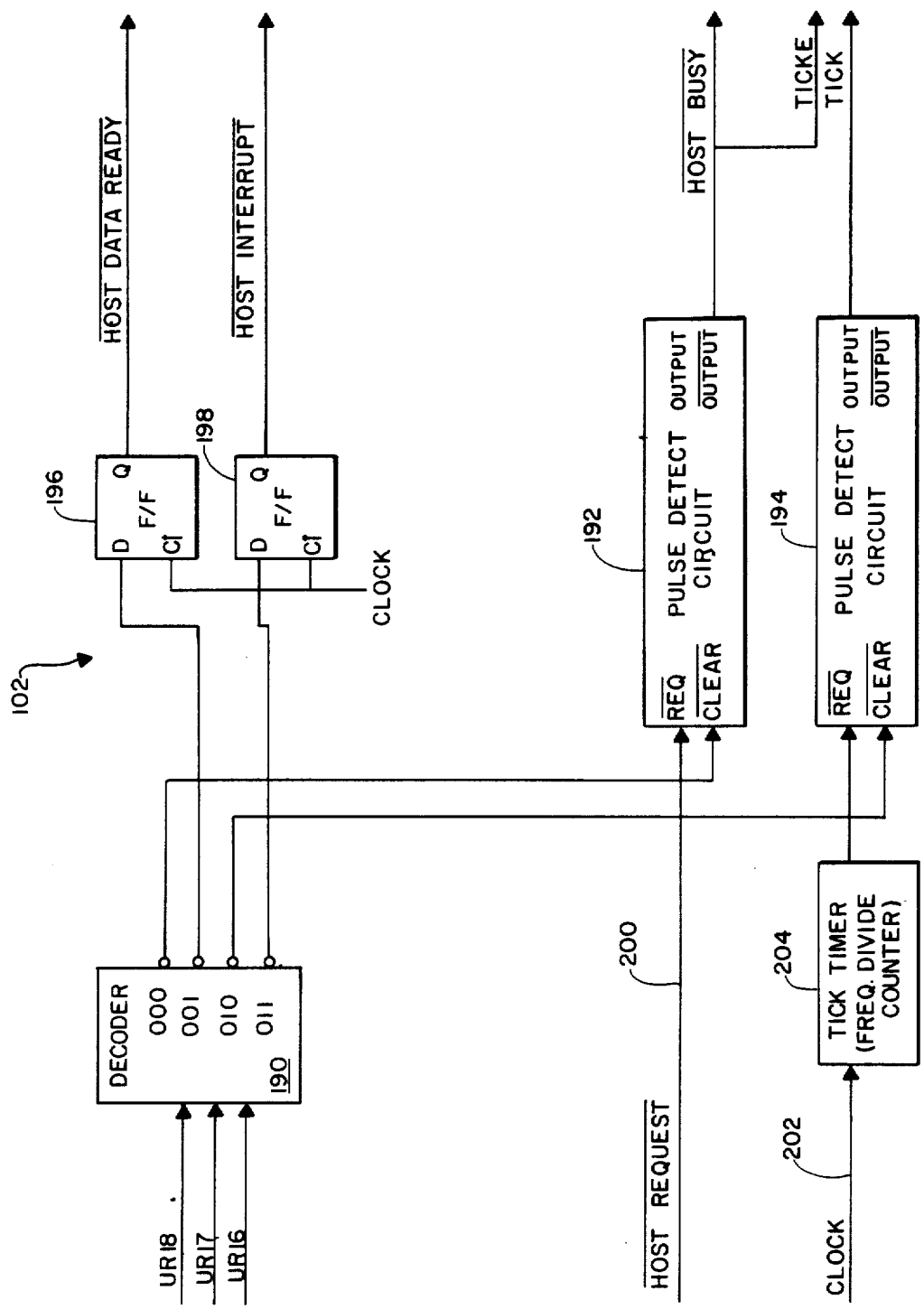
FIG. 20 is a block diagram of the host bus interface control logic of the present invention.

The host bus interface control logic 102 is illustrated in detail in FIG. 20. The host bus interface control logic 102 takes signals from and generates signals to the host processor 12. The host request enters from the host computer 12 and informs the hardware executive 10 that a particular function or address is available and that some action is required. The host request signals triggers the request if the address is in the hardware executive 10 address space. The Host Busy signal goes back to the host computer and informs the host that its request is being processed. The Host Busy line stays down until the request is processed. The host bus interface control logic 102 is comprised of decoder 190 and two pulse detector circuits 192 and 194. Two flip-flops, 196 and 198 connected as shown to decoder 190 generate the Host Data Ready and the Host Interrupt signals. The two pulse detect circuits 192 and 194 are fed by the decoder and the Host Request line 200 and also by the clock signal on line 202 via the tick timer 204 which is a frequency dividing counter.

Figure 21:
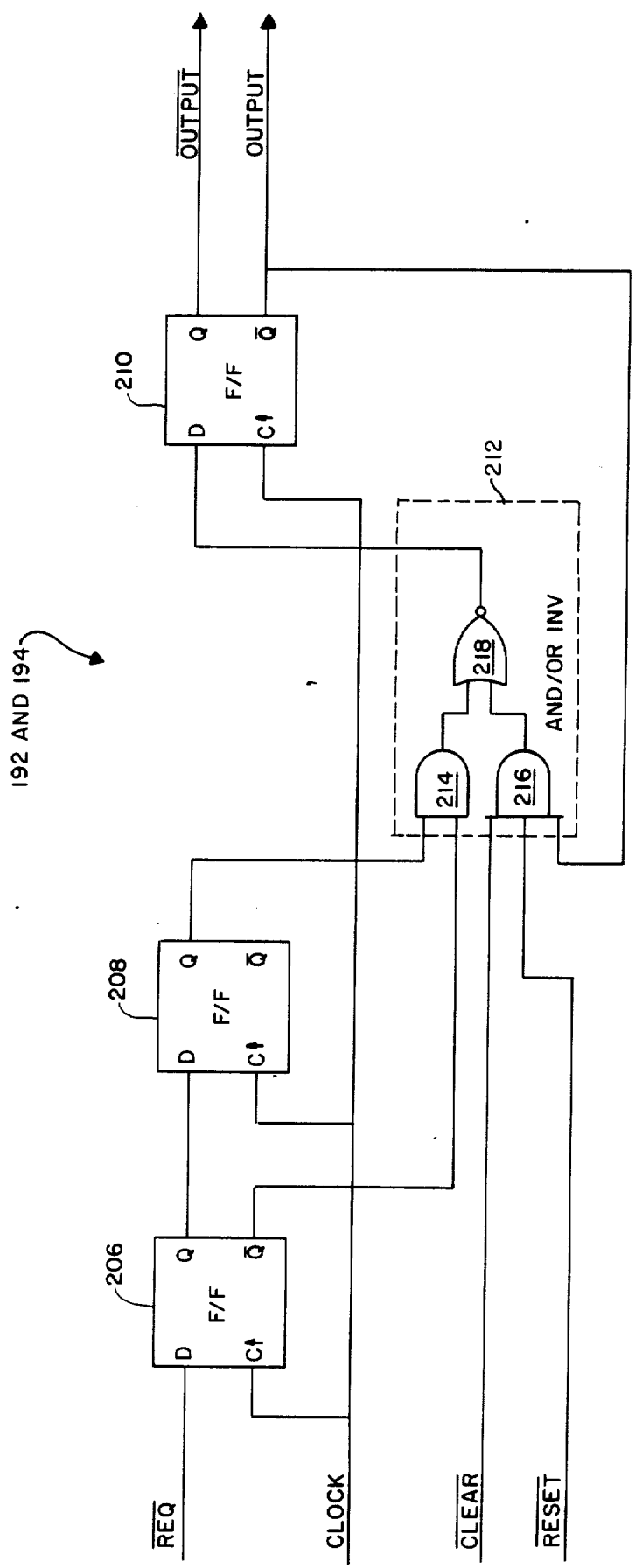
FIG. 21 is a block diagram of the pulse detect circuit portion of a the host bus interface control logic of the present invention.
Figure 22:
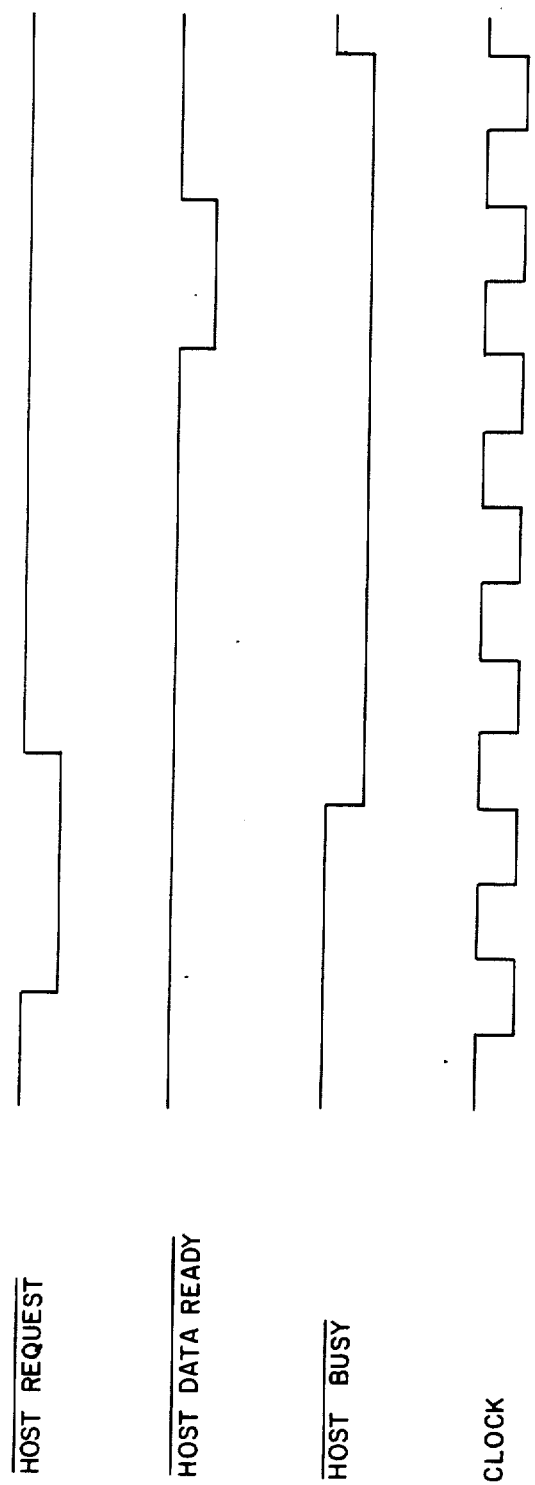
FIG. 22 is a host bus interface control logic timing diagram example.

The pulse detect circuits 192 and 194 are implemented as shown in FIG. 21 which illustrates the gates and flip-flops utilized to implement the pulse detect circuits. More particularly, the pulse detect circuits 192 and 194 are each comprised of three flip-flops 206, 208 and 210 and the AND/OR invert gate 212 which is comprised of AND gate 214, AND gate 216 and NOR gate 218. The timing diagram illustrated in FIG. 22 shows that when a host request comes in "low" into the D input of flip-flop 206, flip-flop 206 synchronizes the request with the hardware executive 10 clock coming in on line 202. As soon as the clock pulse from the hardware executive 10 rises, the Q output of flip-flop 206 goes "low" and the $\overline{Q}$ output of flip-flop 206 will go "high". At this point a "high" will appear at the Q output of flip-flop 208. These is a period of time where flip-flop 206 has a "zero" on its Q output and flip-flop 208 still has a "one" on its Q output. Gating the $\overline{Q}$ output of flip-flop 206 with the Q output of flip-flop 208 at the AND gate 214 results in a signal at the output of AND gate 214 which is a "one" for one cycle only, just after the request line has gone to "zero". The output of AND gate 214 goes through NOR gate 218 and since the input is a "one", the output of the NOR gate will be a "zero". This "zero" goes into the D input of flip-flop 210 and on the next clock cycle, the Q output of flip-flop 210 will generate the output signal which is used as the Host Busy signal returning to the host processor 12. Thus, when the request comes in, two clock cycles later, the Busy Signal will be generated. The foregoing is illustrated on the timing diagram of FIG. 22 where it is seen that when the second clock pulse arrives, the Host Busy signal goes down, indicating that the hardware executive 10 is processing the request. Once the Host Busy line goes down, the $\overline{Q}$ output of flip-flop 210 will be a high and is fed back into the input of AND gate 216, the other two inputs of which are normally "high". Thus, a high will appear at the output of the AND gate 216. This "high" will enter the NOR gate 218 and its output will be "zero" which will maintain the Host Busy line down. This line will remain down until either the clear input to AND gate 216 goes to "zero" or the reset input to the pulse detect circuit goes to "zero". The reset input is used for initialization purposes. The clear input is under microprogram control. It is controlled by the decoder 190 in the host bus interface control logic (FIG. 20) which is controlled by bits UR 18 through UR 16, inclusive, of the microinstruction register 108. A 000 on bits UR 18 through UR 16 of the microinstruction register 108 thus lowers the clear input to the pulse detect circuit 192. Relating decoder 190 to the microcode listing of Table II above, it is seen that the 000 code indicates the action of clearing the Host Bus Interface Busy line.

001 on bits UR 18 through UR 16 from the decoder 190 indicates that the data being returned to the host computer 12 is available to be read, etc.

The bottom portion of the host bus interface control logic 102 is used to generate the "tick". The system clock is divided down to a low frequency by the tick timer 114 which is a frequency divider/counter. It acts to count up to a predetermined count and then resets itself. The pulse detect circuit 194 is the same kind of circuit as the pulse detect circuit 192 previously described with respect to FIG. 21. The divider/counter 114 divides the clock 100 frequency down to the tick frequency and sets the pulse detect circuit 194 in the same manner that a Host Request sets the pulse detect circuit 192 for the Busy signal. However, the microcode implementing the various algorithms may not be ready to process the tick signal. Once the pulse detects circuit 194 is set, it is held in this condition until the next time the microcode executes the transform bits, i.e. the bits having values 111 in the field UR 18 through UR 16 described in more detail in Table II above.

When the microcode is available to process the "tick", the microcode that does process the tick can clear the pulse detector circuit 194. The "tick" signal is an indication that a tick has occurred and serves as a request that the microcode initiate an action. The tick enable, TICK E, is analogous to the Host Busy signal above and prevents the tick from being processed when some other function is in progress.

The transform logic 106 illustrated generally in block diagram form in FIG. 9 will now be described in greater detail with reference to FIG. 16. The purpose of the transform logic 106 is to take signals from various parts of the hardware executive 10 and generate a unique microinstruction address based on the previous state of the machine. The transform logic 106 may be conceptually divided into a mechanism for generating the least significant bit of the microinstruction, for generating the next least significant bit of the microinstruction, and for generating the rest of the bits of the microinstruction. When bits UR 16 through UR 18 of the microinstruction register 108 are 111 (see Table II above) the transform function is being implemented and is used to take information from the host processor 12 and direct it to the appropriate section of the microcode.

Figure 16:
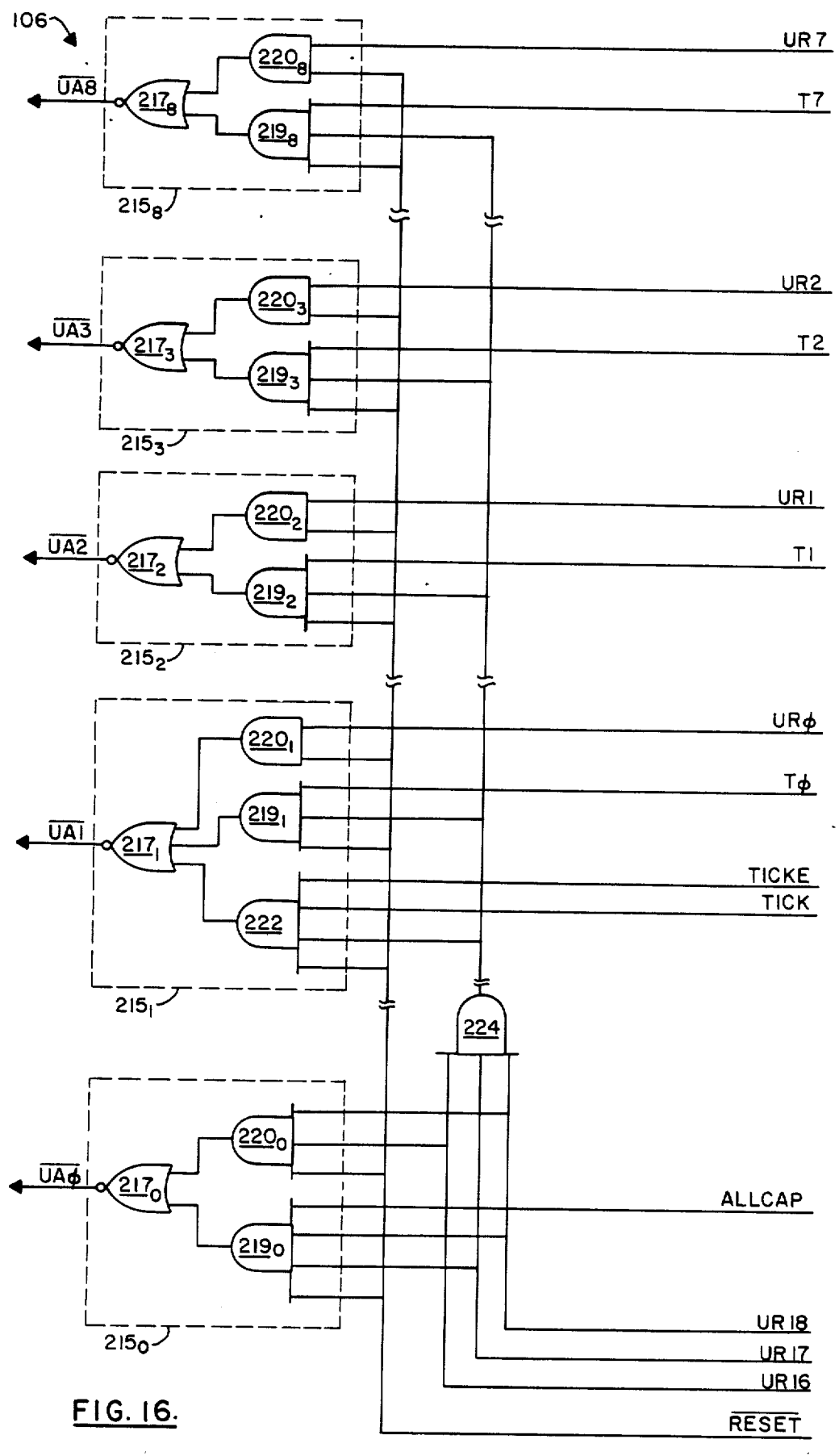
FIG. 16 is a block diagram of the transform logic portion of the present invention.

Transform logic section 106, as illustrated in detail in FIG. 16, is comprised of AND/OR invert gates $215_0$, $215_1$, $215_2$, $215_3$, . . . , $215_8$. AND/OR invert gate $215_0$ is comprised of NOR gate $217_0$ fed by the two AND gates $219_0$ and $220_0$. Likewise, AND/OR gate $214_2$ is comprised of NOR gate $216_2$ which is fed by AND gates $219_2$ and $220_2$.

Likewise, the AND/OR inverter $215_3$ is comprised of a NOR gate $217_3$ fed by AND gates $219_3$ and $220_3$. Also, AND/OR inverter gate $215_8$ is comprised of NOR gate $217_8$ which is fed by AND gates $219_8$ and $220_8$. The AND/OR inverter gates $215_4$ through $215_7$ (not shown) are identically constructed. The transform logic circuit 106 AND/OR inverter gate $215_1$ is comprised of NOR gate $217_1$ which is fed by three AND gates $219_1$, $220_1$ and the AND gate 22. The remaining component of the transform logic 106 is the AND gate 224.

If the transform 106 is not enabled, i.e. bits UR 16 through UR 18 are not 111 (see Table II above), the output of AND gate 224 will be a zero which will cause disconnection of any of the AND gates $217_1$ through $217_8$, inclusive.

In the case for all but the two least significant bits, the contents of the microinstruction 108 are fed back to the transform logic 106. The signals, for example, UR 7 and UR 2 are the outputs of the microinstruction register 108. These signals go straight through the AND gates 220 in each of the AND/OR invert gates 214 and exit the NOR gates 217. The reset line comes from the power reset circuit 112. If the reset line seen at the bottom right hand corner of FIG. 16 goes to zero, the output of the AND/OR invert gates 215 will be forced to microinstruction address zero, i.e. they will be all high, since this is active "low" logic. Since the reset is normally "high", microinstruction register signals UR going straight through the AND gates 219, 220 and 222 and the NOR gates 217 will be in effect. The reset signal thus turns off all the AND gates in the logic circuits $215_0$ through $215_8$ inclusive.

If the transform 106 is enabled, i.e. the microinstruction register bits UR 16 through UR 18 are 111 (see Table II above), then the AND gate 224 will be enabled. Consequently, the AND gates 219 will be enabled.

For all except the two least significant bits, the output T of the command register 118 will go through the AND gates of the AND/OR invert networks 215 when the transform 106 is enabled and the reset is not resetting. The output of these AND gates are OR'ed with the output coming from the microinstruction register loop, signals UR 0 through UR 7.

AND/OR invert gate $215_0$ responds to the least significant bit from the output of the microinstruction register 108, i.e. bits UR 16 through UR 18 as is further defined in Table II above.

The next to the least significant bit is processed by the AND/OR invert gate $215_1$ which has an extra AND gate 222 which allows the tick and tick enable signals into the transform logic 106. If the transform function is being performed and there is no reset signal and the tick enable is one, busy is zero, and there is a tick request from the pulse detect circuit 194, then a "one" input will be produced on the line denoted $\overline{UA1}$.

Figure 23:
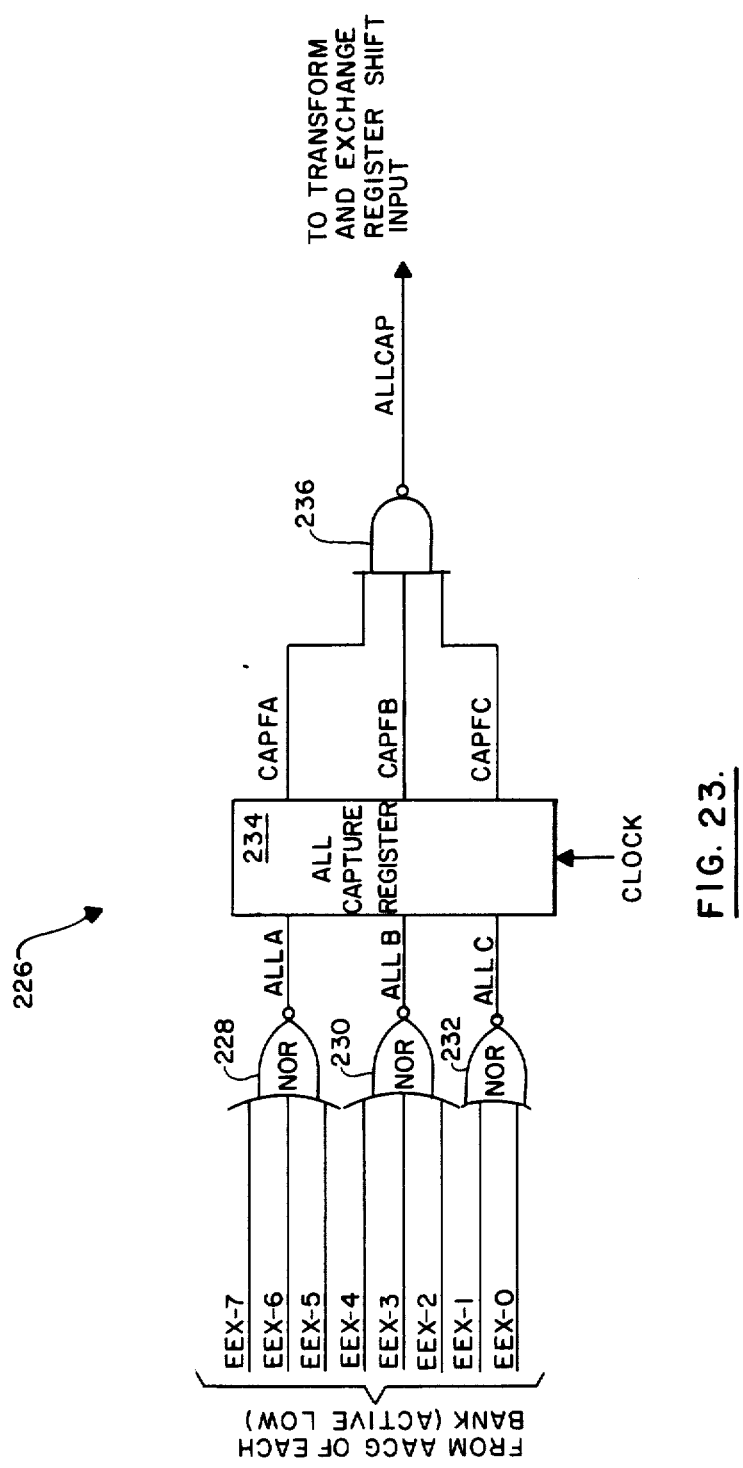
FIG. 23 is a block diagram of the ALLCAP register and gate of the present invention.

Referring again to FIG. 9, one component thereof previously omitted from the discussion will now be described. More particularly, the all capture register and gate 226 generates the signal denoted ALLCAP. Referring to FIG. 23 the all capture register and gate 226 is illustrated in further detail. As seen in FIG. 23, the all capture register and gate 226 is comprised of three NOR gates 228, 230 and 232 followed by the all capture register 234 which supplies the inputs to NAND gate 236. The output of the NAND gate 236 is the signal ALLCAP which is sent to the transform 106 and the exchange register 78 shift inputs.

Figure 24:
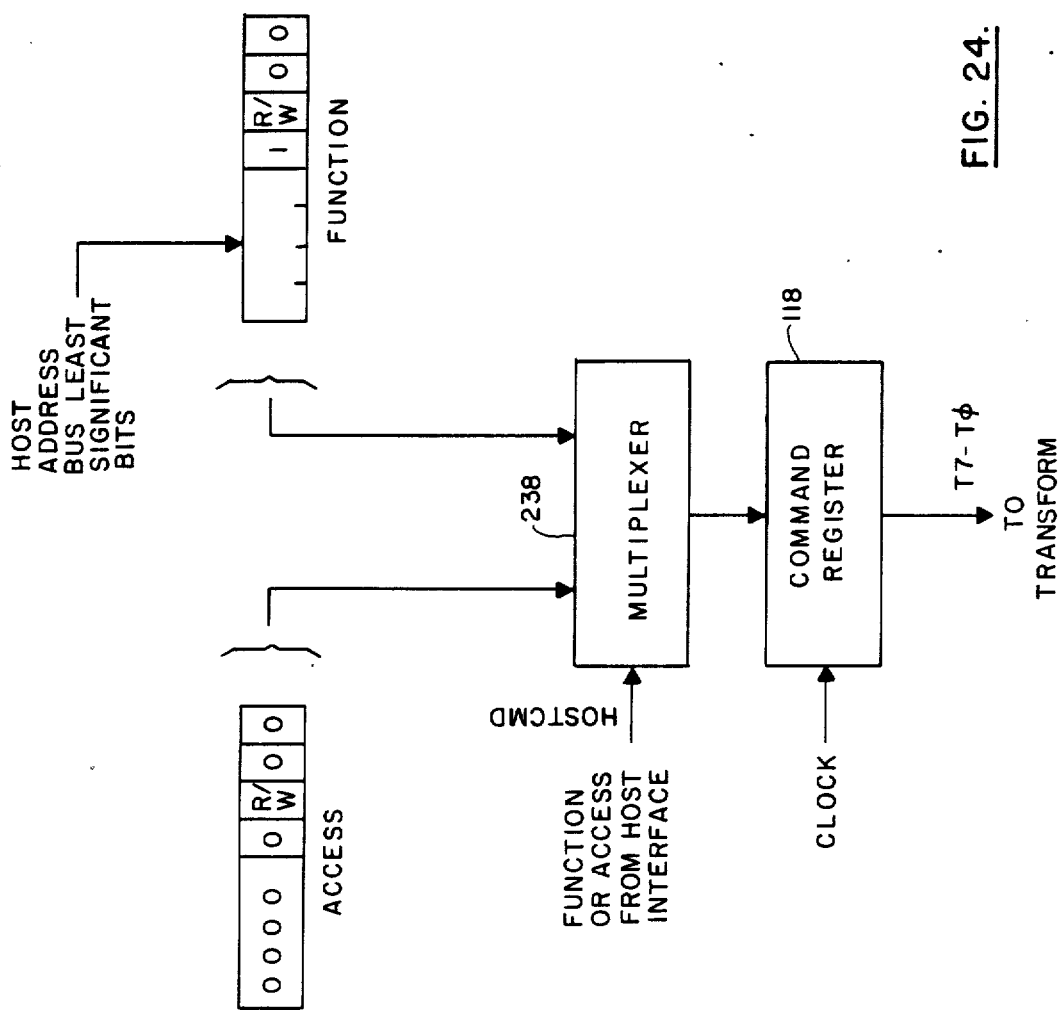
FIG. 24 is a block diagram of the interface of the host memory address bus to the command register of the present invention.

Above the command register 118 (see FIG. 9) is a multiplexer 238 which is controlled by the host command signal. Referring to FIG. 24 which illustrates in detail the multiplexer 238 and the command register 118, it is seen that there are two kinds of information which the host processor 12 can send to hardware executive 10. One type of information is that information indicating a function, like the Dispatch Check function and the other type of information is a request for a direct read or write. The host 12 provides the host command signal which controls the multiplexer 236 so there will be one set of bits entering the command register 118 if a function, like the Dispatch Check function, is requested and another set of bits is sent into the command register 118 if a read or write is to be performed.

A direct access if implemented by a read or write bit in the third position as is illustrated in FIG. 24. A function as opposed to a direct access is implemented by a "one" in the fourth bit position of the host address bus bits as is illustrated. Also entering the function bit locations are the least significant bits of the address bus from the host 12 directing the particular function to be implemented. The purpose of this interface comprised of the multiplexer 238 and command register 118 is to uniquely define what the hardware executive 10 is to do.

As an example of how the hardware executive 10 of the present invention works, implementation of a read function will now be described. In implementing a read function it is desired that the data be read from the host processor 12 directly in the hardware executive 10 associative memory $20_n$. First, the host processor 12 puts out on its memory bus the address of the location to be read, a signal indicating that a read is to be performed vis a vis a write, a request signal to perform the read and a host command indicating an access operation as opposed to a function operation as is illustrated in FIG. 24.

Since this is a read function, the host command signal sets the multiplexer 238 to establish in the command register 118 the bit code corresponding to read function. The command register 118 will thus be loaded with this unique number as is illustrated at the upper left of FIG. 24 in the block entitled ACCESS. The hardware executive microsequencer (see FIG. 10) is performing the transform 106 function and will be cycling until the request signal enters the transform 106. The contents of the command register 118 will now be brought down to the transform logic network 106 where these contends are converted to a unique microinstruction address which essentially directs in the hardware executive 10 to the function to be performed in the microcode.

On the first microinstruction cycle, the host address is loaded into the exchange register 78 via the multiplexer 86. On the next cycle, the exchange register 78 output goes to the bit and bank decoder sections 64 and 62, respectively. The bank decoder 62 output goes to the bank capture flip-flops 56 via the bank multiplexer 58. The bit decoder output 64 goes to the bus buffer 66 through the bit priority logic 68 and thence on to the input BI bus 22. From there the information goes into the capture flip-flops 40 of each of the associative memory banks $20_n$. A single associative memory location has now been selected and the information stored there will be read out. The address of the location within the selected memory banks is in the capture flip-flops 40. The host address plus the least significant bit of the word to be read are entered into the address register 126. The multiplexer 128 is set up such that the three least significant bits of the host address are concatenated with the bits from the microinstruction register 108 and there is thereby entered into the address register 126 the address of the bit position zero of the segment that is to be addressed from the host processor 12. The bit within the segment has been selected by the microinstruction register 108. The segment has been selected by the three least significant bits coming from the host address bus.

Next, the serial adder/subtracter 36 is initialized and the emit generation logic 84 is set up to put out a "zero" such that the "zero" is subtracted from the number coming from the memory.

The contents of the selected RAM 34 are now loaded into the registers at the outputs of the serial adder/subtracters 36 and meanwhile the host address plus bit 1 of the segment addressed are put in the address register. While the contents of the RAM 34 are being read out for bit position zero, simultaneously the address register 126 is being set up to obtain bit position one on the next cycle. This is known as "pipelining". All the serial adder/subtracters 36 and RAMs 34 are working in parallel but only the one that has been selected by the capture flip-flop 40 is putting out a "one" or a "zero". All the others are putting out ones.

The output of the serial adder/subtracters 36 is put through the AACG circuit comprised of the OR gate 44 and the AND gate 46 and from there goes through the ALLCAP circuit and thence into the shift input of the exchange register 78. OR gates 44 OR in a "one" from the capture flip-flops 40 corresponding to the locations not selected and a zero for the one that was selected. All OR gates 44 not corresponding to the selected location have "ones" and the OR gate corresponding to the bit position read has the bit read at its output. The AND gate 46 outputs will all be "one" except possibly the one that has been read. The AACG outputs of the AND gates 46 are sent around to the all capture register and gate 226 which generates the signal ALLCAP. This ALLCAP signal is sent to the shift input of the exchange register 78. One of the functions of the microinstruction bits UR 27 through UR 24 is that of shifting the exchange register 78 implemented by the code 1001 (see Table II above). Bit zero has been channeled through the ALLCAP circuit and is shifting into the exchange register 78. The following bits of the selected segment eventually fill up the exchange register 78 in this manner. When this happens, the word to be sent back to the host computer 12 is in the exchange register 78. The Host Data Ready signal is pulsed under control of microinstruction register 108 bits UR 16 through UR 18 (see Table II above). The host computer 12 then reads the word out of the exchange register 78. The Host Busy signal is cleared and the transform logic 106 is now ready to engage another function.

The write function begins as does a read function. The host processor in this case provides the data input. The host address of the location to be written into is put into the exchange register 78. The exchange register 78 output is processed through the bank and bit decoders 62 and 64, respectively, and into the capture flip-flops 40. The host data to be written is put in the exchange register 78. The host address and least significant bit of the segment to be written into are used to set up the RAM memory address with the four least significant bits of the host address and bit zero from the microinstruction register 108 to get the first bit within the selected memory location set up. The individual bits of the word to be written are selected on successive cycles as the EMIT bit via the bit selectors 90 and 92. The EMIT bit is then written into the DI input of the RAM 34 selected by the capture flip-flops 40 via the multiplexer 38. The only RAM component that will be written into is the one that has been enabled by the combination of signals from the capture flip-flops 40 (input E to the RAM 34) and the bank capture flip-flops 56 (signals AS). This cycle continues until all bit positions are written into and the Host Busy signal is cleared indicating to the host computer 12 that this function is complete.

What is claimed is:

1. In a computer system including a host computer processor connected to a host computer memory via a host memory bus, the improvement comprising computer hardware executive means connected to said memory bus for implementing executive functions in said computer system, said computer hardware executive means comprising:

memory mapped interface means for providing a connection between said memory bus and said computer hardware executive;

microsequence control logic means coupled to said memory mapped interface means for enabling programmable control of said computer hardware executive and containing a set of operation algorithms based on a set of parameters;

associative memory logic means coupled to said microsequence control logic means for storing entries in computer executive tables and for retrieving, sorting, making comparisons against and modifying the entries in the computer executive tables as directed by the microsequence control logic means; and register logic means coupled to the microsequence control logic means for storing, retrieving and modifying the parameters of the operation algorithms as directed by the microsequence control logic means.

2. The improvement of claim 1 wherein the computer hardware executive includes a plurality of memory locations, each having associated therewith one of a range of memory location addresses and wherein said memory mapped interface means comprises:

address space detector means coupled to the host memory bus for determining if an address provided by the host processor is in the range of addresses;

executive function detector means coupled to the host memory bus for determining whether an address in the range of addresses is dedicated to an executive function;

host processor address interface means coupled to said host memory bus for maintaining addresses provided by the host processor;

host processor write data interface means coupled to the host memory bus for maintaining data provided by the host processor;

host processor read data interface means coupled to the host memory bus for returning data to the host processor;

host processor read/write signal interface means coupled to the host memory bus for determining whether the host processor is requesting a read function from or a write function to the computer hardware executive means;

host processor data ready logic means coupled to the host memory bus for informing the host computer when data from the computer hardware executive is ready for transfer to the host processor;

host processor busy logic means coupled to inform the host computer when it no longer needs to maintain connection to the memory mapped interface means;

host processor interrupt logic means coupled to the host processor to inform the host processor to execute alternative processing;

host processor reset signal interface means coupled to determine when the host processor is being initialized; and host processor request signal interface means coupled to determine when the host processor has furnished valid information to the memory mapped interface means.

3. The improvement of claim 2 wherein the address space detector means comprises:
a comparator network.

4. The improvement of claim 2 wherein the executive function detector means comprises:
a comparator network.

5. The improvement of claim 2 wherein the host processor address interface means comprises:
a buffer network.

6. The improvement of claim 2 wherein the host processor write data interface means comprises:
a buffer network.

7. The improvement of claim 2 wherein the host processor read data interface means comprises:
a buffer network.

8. The improvement of claim 2 wherein the host processor read/write signal interface means comprises:
a buffer network.

9. The improvement of claim 2 wherein the host processor data ready logic means comprises:
a buffer network.

10. The improvement of claim 2 wherein the host processor busy logic means comprises:
a first flip-flop network (206) coupled to the output of the host processor request signal interface means;
a second flip-flop network (208) coupled to the first flip-flop network;
an AND/OR invert network coupled to the first and second flip-flop networks;
a third flip-flop network coupled to the output of the AND/OR invert network; and a buffer network (105) connected to the output of the third flip-flop network.

11. The improvement of claim 2 wherein the host processor interrupt logic means comprises:
a buffer network.

12. The improvement of claim 2 wherein the host processor reset signal interface means comprises:
a buffer network (111).

13. The improvement of claim 2 wherein the host processor request signal interface means comprises:
a buffer network (101) having an output connected to the input of the host processor busy logic means.

14. The improvement of claim 1 wherein the microsequence control logic means comprises:
microprogram memory means (104) for enabling retrieving of a microprogram;
microinstruction register means (108) coupled to the microprogram memory means for holding a microprogram received from the microprogram memory means;
microinstruction address transform means (106) coupled to the microprogram memory means for generating a distinct address corresponding to each distinct microinstruction;
command logic means (118, 120) coupled to the microinstruction address transform means for supplying the microinstruction address transform means with a set of unique function identifying signals; and
microinstruction decode logic means coupled to the output of the microinstruction register means for generating a set of control signals in response to the output of the microinstruction register means.

15. The improvement of claim 14 wherein the microinstruction register means comprises:
a register including a plurality of flip-flop networks, each flip-flop network being dedicated to a distinct bit of the microinstruction.

16. The improvement of claim 14 wherein the microinstruction address transform means comprises:
a plurality of AND/OR invert gates connected to the output of the command logic means.

17. The improvement of claim 1 wherein the associative memory logic means comprises a plurality of associative memory logic banks interconnected by an associative memory bus structure each of the associative memory logic banks comprising:
a random access memory;
an arithmetic unit (36) connected to the output of the random access memory;
a data multiplexer (38) connected to an input of the random access memory;
a plurality of location capture flip-flop networks (40) connected to an input of the random access memory;
a logic gate (44) having a first input connected to the output of the plurality of location capture flip-flop networks and having a second input connected to the output of the arithmetic unit;
a location capture multiplexer having its input connected to the output of the logic gate and having an output connected to input of the plurality of location capture flip-flop networks;
a buffer network (48) for alternately connecting or disconnecting the outputs of each of the plurality of location capture flip-flop networks to the associative memory bus structure; and an AND gate (46) connected to the output of the logic gate (44).

18. The improvement of claim 17 wherein the associative memory logic means further comprises:
   bank selection logic network means (52) for selectively activating one or more of the plurality of associative memory logic banks, each associative memory logic bank having a plurality of storage locations and
   bit selection logic means (54) for selectively activating one or more of the plurality of storage locations in the selected associative memory logic bank.

19. The improvement of claim 18 wherein the register logic means further comprises:
   exchange register means for storing an intermediate value in the same word format as that used by the host processor;
   a queue counter;
   priority register means for storing simultaneously the output of the bank selection logic network means and the output of the bit selection logic means;
   a time counter;
   a multiplexer connected to the exchange register, the queue counter, the priority register and the time counter; and
   omit generation logic means connected to the queue counter and time counter for selecting a bit to be used as a data bit common to each of the plurality of storage locations.

20. The improvement of claim 2 wherein the microsequence control logic means comprises:
   microprogram memory means (104) for enabling retrieving of a microprogram;
   microinstruction register means (108) coupled to the microprogram memory means for holding a microprogram received from the microprogram memory means;
   microinstruction address transform means (106) coupled to the microprogram memory means for generating a distinct address corresponding to each distinct microinstruction;
   command logic means (118, 120) coupled to the microinstruction address transform means for supplying the microinstruction address transform means with a set of unique function identifying signals; and
   microinstruction decode logic means coupled to the output of the microinstruction register means for generating a set of control signals in response to the output of the microinstruction register means.

21. The improvement of claim 20 wherein the associative memory logic means comprises a plurality of associative memory logic banks interconnected by an associative memory bus structure each of the associative memory logic banks comprising:
   a random access memory;
   an arithmetic unit (36) connected to the output of the random access memory;
   a data multiplexer (38) connected to an input of the random access memory;
   a plurality of location capture flip-flop networks (40) connected to an input of the random access memory;
   a logic gate (44) having a first input connected to the output of the plurality of location capture flip-flop networks and having a second input connected to the output of the arithmetic unit;
   a location capture multiplexer having its input connected to the output of the logic gate and having an output connected to input of the plurality of location capture flip-flop networks;
   a buffer network (48) for alternately connecting or disconnecting the outputs of each of the plurality of location capture flip-flop networks to the associative memory bus structure; and
   an AND gate (46) connected to the output of the logic gate (44).

22. The improvement of claim 21 wherein the associative memory logic means further comprises:
   bank selection logic network means (52) for selectively activating one or more of the plurality of associative memory logic banks, each associative memory logic bank having a plurality of storage locations and
   bit selection logic means (54) for selectively activating one or more of the plurality of storage locations in the selected associative memory logic bank.

23. The improvement of claim 21 wherein the register logic means further comprises:
   exchange register means for storing an intermediate value in the same word format as that used by the host processor;
   a queue counter;
   priority register means for storing simultaneously the output of the bank selection logic network means and the output of the bit selection logic means;
   a time counter;
   a multiplexer connected to the exchange register, the queue counter, the priority register and the time counter; and
   omit generation logic means connected to the queue counter and time counter for selecting a bit to be used as a data bit common to each of the plurality of storage locations.

* * * * *